(12) United States Patent
Latvis, Jr.

(10) Patent No.: US 10,045,615 B2
(45) Date of Patent: Aug. 14, 2018

(54) MODULAR AND RECONFIGURABLE HIGH PERFORMANCE AUDIO STAND

(71) Applicant: Michael P. Latvis, Jr., Buffalo, NY (US)

(72) Inventor: Michael P. Latvis, Jr., Buffalo, NY (US)

( * ) Notice: Subject to any disclaimer, the term of this patent is extended or adjusted under 35 U.S.C. 154(b) by 0 days.

(21) Appl. No.: 15/153,817

(22) Filed: May 13, 2016

(65) Prior Publication Data

US 2017/0055701 A1  Mar. 2, 2017

Related U.S. Application Data

(60) Provisional application No. 62/160,880, filed on May 13, 2015, provisional application No. 62/247,916, filed on Oct. 29, 2015.

(51) Int. Cl.

| | | |
|---|---|---|
| F16M 11/00 | (2006.01) | |
| A47B 47/00 | (2006.01) | |
| A47B 81/06 | (2006.01) | |
| A47B 57/46 | (2006.01) | |
| A47B 81/00 | (2006.01) | |
| A47B 91/02 | (2006.01) | |
| A47B 91/04 | (2006.01) | |
| F16F 15/02 | (2006.01) | |
| F16M 11/24 | (2006.01) | |
| H04R 1/02 | (2006.01) | |

(52) U.S. Cl.
CPC ...... *A47B 47/0091* (2013.01); *A47B 47/0083* (2013.01); *A47B 57/46* (2013.01); *A47B 81/00* (2013.01); *A47B 81/064* (2013.01); *A47B 91/024* (2013.01); *A47B 91/04* (2013.01); *F16F 15/02* (2013.01); *F16M 11/24* (2013.01); *H04R 1/026* (2013.01)

(58) Field of Classification Search
CPC .. A47B 45/00; A47B 47/0091; A47B 47/0066
See application file for complete search history.

(56) References Cited

U.S. PATENT DOCUMENTS

| | | | | |
|---|---|---|---|---|
| 3,056,507 A | * | 10/1962 | Squires, Jr. | A47B 57/18 108/106 |
| 5,865,126 A | * | 2/1999 | Miranda | A47B 87/0246 108/180 |
| 5,918,750 A | | 7/1999 | Jackson | |

* cited by examiner

*Primary Examiner* — Amy Jo Sterling
(74) *Attorney, Agent, or Firm* — Del Vecchio and Stadler LLP

(57) ABSTRACT

A modular and reconfigurable stand is provided. The stand has legs that support bolt plates and the bolt plates are bolted to brace assemblies. The brace assemblies support shelves. The brace includes structurally identical cross damping support arms. The brace assembly also includes structurally identical first and second brace mounts. Each of the cross damping support arms is connected to each of the first and second brace mounts, and the brace mounts are connected to two legs. Double damper brace assemblies are also provided. In another embodiment a modular performance stand is provided having cross damping support arms that are connected to first and second modular shelf mounts having channels. The channels support four or more isolator elements. The modularity of the cross damping support arms and modular shelf mounts allows the width and depth of the modular performance stand to be varied to optimize performance.

3 Claims, 28 Drawing Sheets

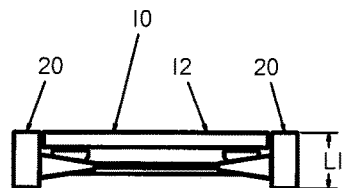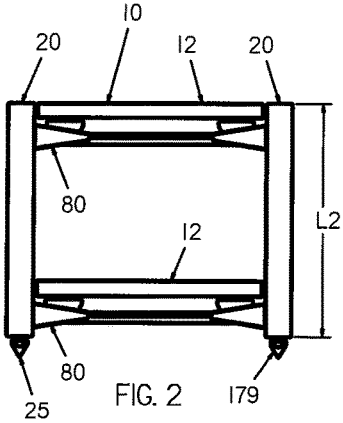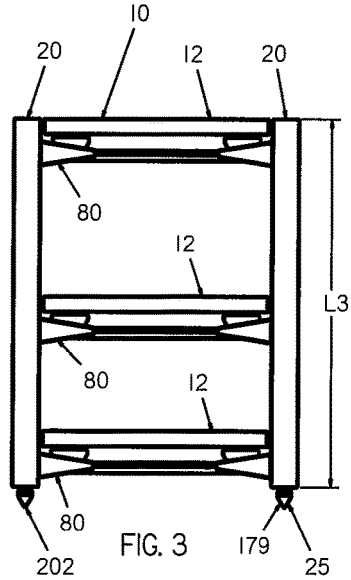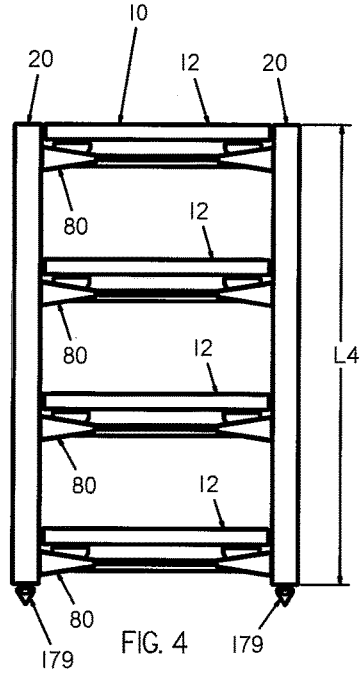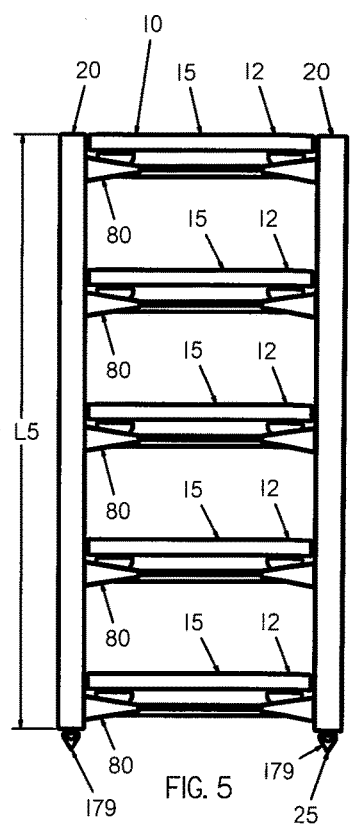

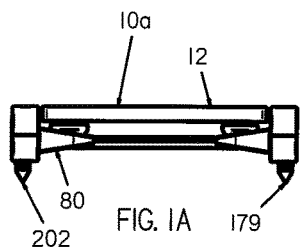
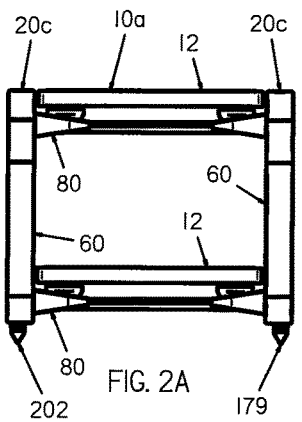
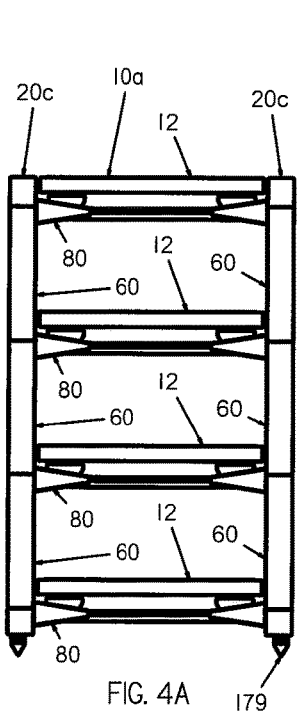
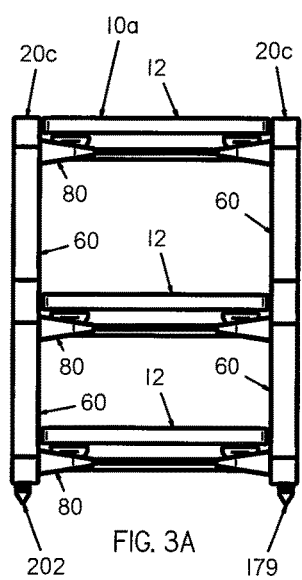
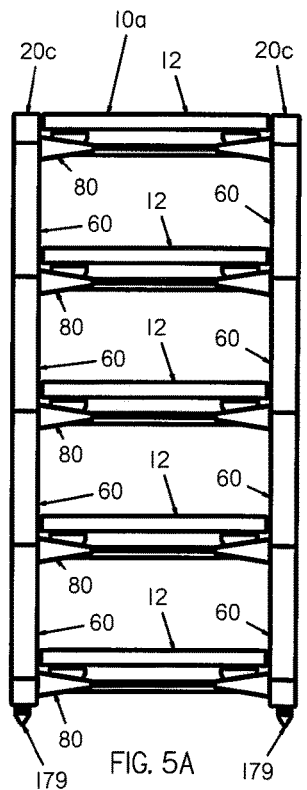

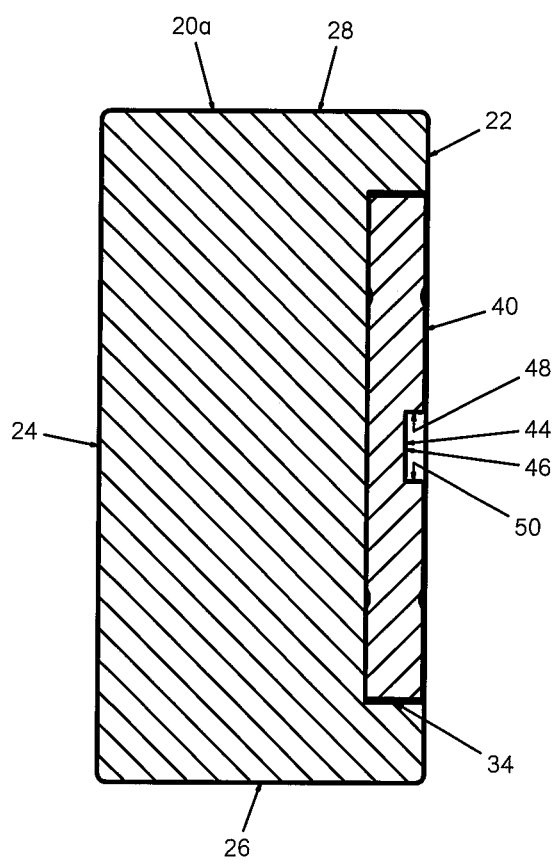
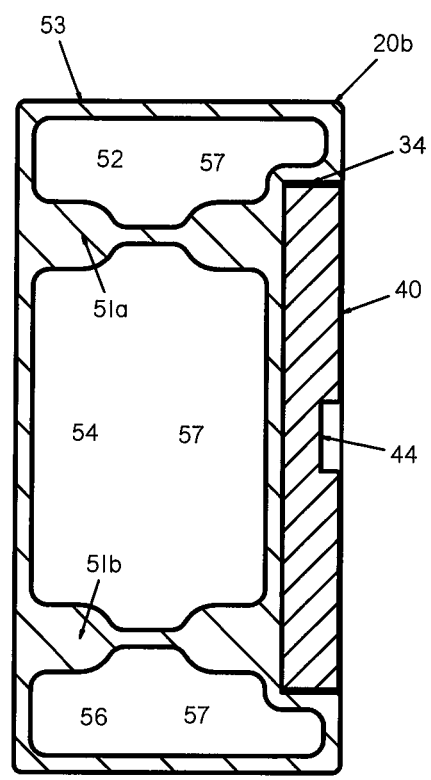
FIG. 8
FIG. 9

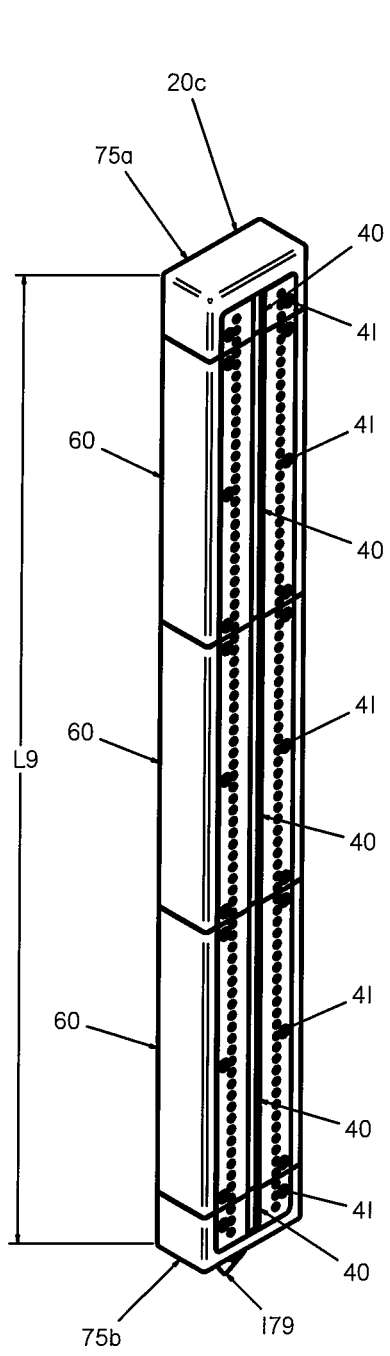
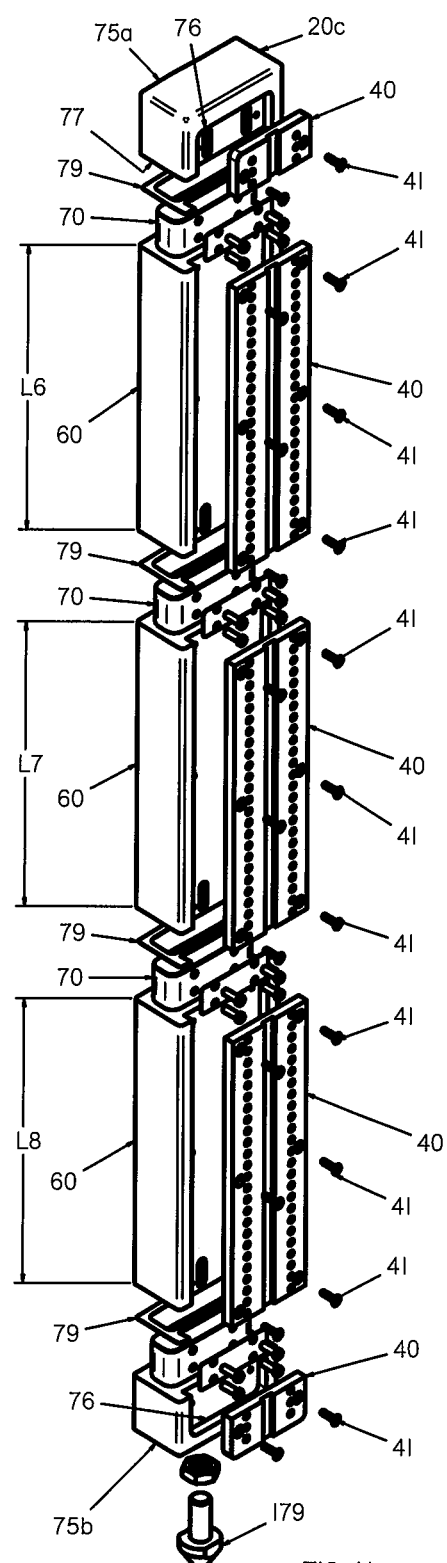
FIG. 10a
FIG. 11a

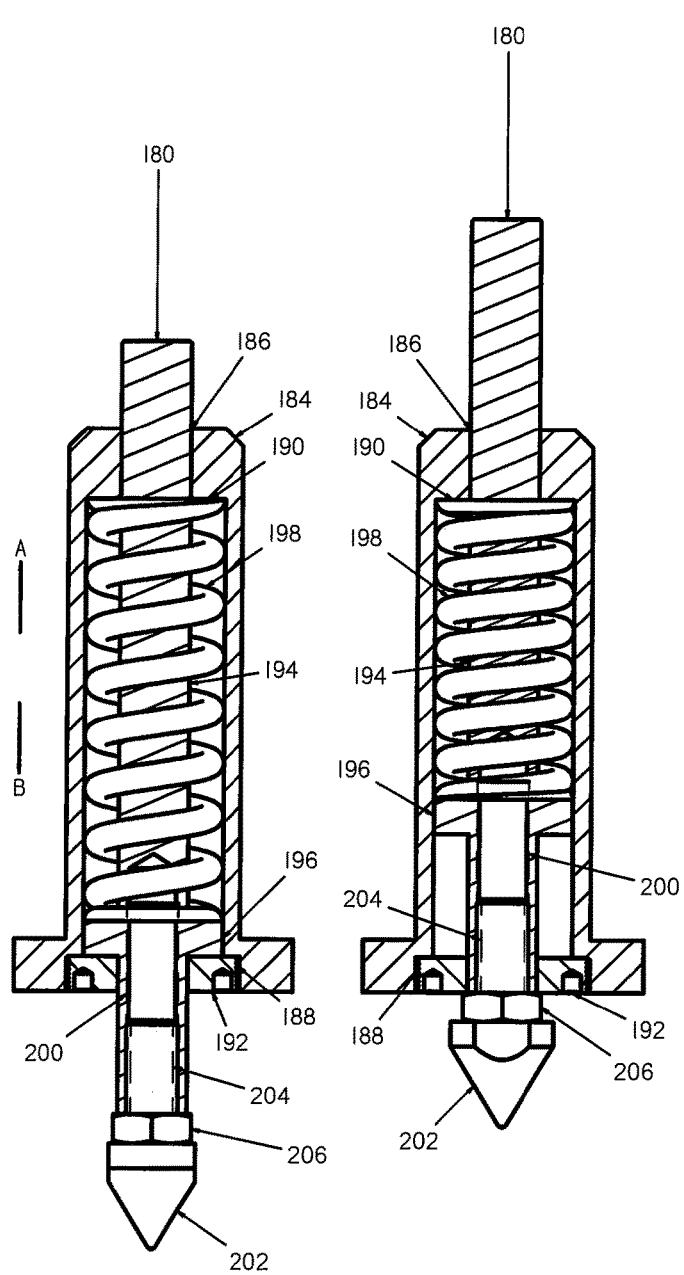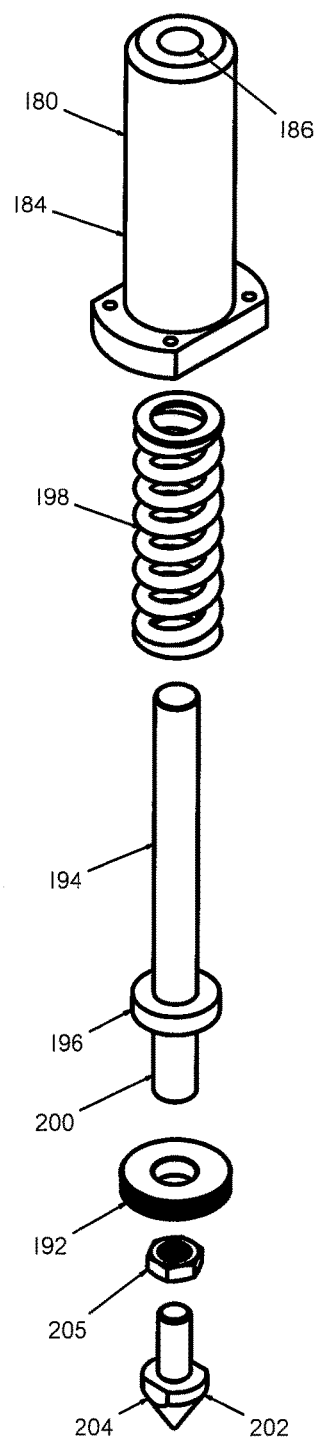
FIG. 17   FIG. 18   FIG. 19

MODULAR AND RECONFIGURABLE HIGH PERFORMANCE AUDIO STAND

CROSS REFERENCE TO RELATED APPLICATIONS

This application claims the benefit of Provisional U.S. Patent Application No. 62/247,916 filed on Oct. 29, 2015, and Provisional U.S. Patent Application No. 62/160,880 filed on, May 13, 2015 and the entire content and disclosure of each is hereby incorporated herein by reference.

BACKGROUND

Expensive audio equipment is for individuals that desire to hear the very best output from their audio systems. Sometimes these individuals will refer to their audio equipment as high performance equipment. In addition, the stores that sell such high end audio equipment charge a great deal of money for the equipment.

However, there is a problem with the devices that are used to support the high performance audio and electronic equipment. For example, some support devices are not structurally sound, wobble, or are moved or swayed by vibrations in the floor. Indeed, merely walking by the audio equipment will cause the sound produced to become garbled or may even result in the audio equipment skipping. Such skipping is undesirable for a plurality of reasons. Performance degradation is also caused by vibration and noise from the speakers and other sources in the system that are transmitted directly or indirectly to the equipment of the system.

In addition, there are audio and electronic equipment stands on the market, but these products require the customer to assembly them in most instances. Assembling audio stands requires the customer follow complicated instruction that must be filed exactly. If the instructions are not followed exactly, then the stand will be built incorrectly and sound quality will be diminished. In addition, once assembled the user is not able to modify these stands.

In addition, these audio stands have fixed dimensions, meaning the customer is provided with no option of reconfiguring the stand. Thus, a new stand must be ordered each time the customer purchases a piece of audio or electronic equipment that is not able to be accommodated on the stand. The old stand is either put into storage or disposed of and large amounts of money may end up being wasted.

Thus, there is a need for a stand for electronic and audio equipment that overcomes these problems associated with stands currently available.

SUMMARY

A modular and reconfigurable stand is provided capable of supporting at least one shelf. The stand has legs that support bolt plates and the bolt plates are bolted to brace assemblies. The brace assemblies support shelves. The stand is easy to assemble and disassemble and it is easy to reconfigure the stand to a different size with a minimal number of pieces. All assembly, disassembly and reconfiguration can be done by the end user with a minimal amount of effort and will a very low probability or risk the end user will make and error in the process.

It is pointed out that this is an optimal design, because this configuration flexibility is achieved with only changing one part per degree of freedom. There are three (3) degrees of freedom in the design of an audio system (length, width, and height). Thus, the optimal modular and reconfigurable stand design achieves configuration flexibility with only three (3) parts (one for each degree of freedom). The design presented in herein achieves this optimal design objective.

The brace assemblies of the stand are made of interchangeable components, such that a plurality of differently sized stands can be made with a minimal number of components. One of the advantages of this is that in the past when a custom order had to be filled, a new stand had to be built from scratch. This problem is overcome by the use of a brace assembly made of a minimal number of components of various sizes that can be made in advance and to satisfy virtually any custom order virtually immediately.

The brace assembly includes one or more structurally identical cross damping support arms. The brace assembly also includes structurally identical first and second brace mounts. Each of the cross damping support arms is connected to each of the first and second brace mounts, and each brace mount is connected to two legs. The construction of the brace assembly is stiff and the brace assembly includes damping support arm dampers that are disposed in the cross damping support arms. In addition the legs are filled with damping material, or made from an optimized composite, or inherently damped solid material. Thus, solids, damped or not damped, composites, and filled structures may be used. Thus, the legs and brace assemblies provide for high frequency energy damping and resonance control to minimize peak amplitude of structural response at all resonance frequencies.

The stand has legs that may be one piece of may be formed from leg segments.

In another preferred embodiment there are provided are provided double damper brace assemblies.

One or more of the legs is equipped with an isolation mount assembly that prevents the transfer of low frequency energy (about a few hundred hertz or less) from the floor to the stand. In other preferred embodiments the legs have rigid feet, for example a solid foot or cone.

In another preferred embodiment the stand includes a mounting plate that is connected to the isolation mount assemblies. The mounting plate further restricts the stand from swaying when it is subjected to frequency-type energy and low frequency inputs.

In another preferred embodiment the stand is not present and there is a speaker supported on the floor. Isolation mount assemblies are used directly with and support the speaker on the floor. Not only can the speaker be supported on the isolation mount assemblies, but also virtually any piece or type of electronic equipment can be supported on the isolation mount assemblies. The isolation mount assemblies prevent the transfer of low frequency energy generated by the speaker (or other devices and equipment) to the floor, and this prevents the degradation of outputs from the speaker or other electronic equipment supported by the isolation mount assemblies.

In another preferred embodiment, the isolation mount assemblies are installed in the speaker at the point of manufacture.

In another preferred embodiment there is a modular performance stand having first and second modular shelf mounts and cross damping support arms that are connected to first and second modular shelf mounts. The first and second modular shelf mounts define channels with having channel base walls. A shelf having a plurality of isolator elements is provided. The isolator elements are supported on the channel base walls. The number of isolator elements can be four or more, that is, the channel base walls can support a plurality of isolator elements as required for a particular application. For example, if the load on the shelf is great, more isolator elements can be utilized to carry the load and optimize performance. There can be more than one shelf in the modular performance stand by adding support legs to support additional cross damping support arms and first and second modular shelf mounts.

The modularity of the cross damping support arms and modular shelf mounts allows the width and depth of the modular performance stand to easily varied, while at the same time performance can be optimized.

BRIEF DESCRIPTION OF THE DRAWING FIGURES

FIG. 1 is a front view of a modular and reconfigurable stand having one shelf.

FIG. 1A is a front view of another embodiment of the modular and reconfigurable stand having one shelf and legs that are rectangular.

FIG. 2 is a front view of a modular and reconfigurable stand having two shelves.

FIG. 2A is a front view of another embodiment of the of a modular and reconfigurable stand having two shelves and legs segments.

FIG. 3 is a front view of a modular and reconfigurable stand having three shelves.

FIG. 3A is a front view of another embodiment of the modular and reconfigurable stand having three shelves and leg segments.

FIG. 4 is a front view of a modular and reconfigurable stand having four shelves.

FIG. 4A is a front view of another embodiment of the modular and reconfigurable stand having four shelves and leg segments.

FIG. 5 is a front view of a modular and reconfigurable stand having five shelves.

FIG. 5A is a front view of another embodiment of the modular and reconfigurable stand having five shelves and leg segments.

FIG. 8 is a cross sectional view of a leg taken along cut line X-X of FIG. 7.

FIG. 9 is a cross sectional view of another embodiment of a leg.

FIG. 10A is a perspective view of another embodiment of showing a segmented leg with distal and proximal end segments.

FIG. 11A is an exploded view of segmented leg having distal and proximal end segments.

FIG. 17 is a sectional view of an isolation mount assembly.

FIG. 18 is a sectional view of the isolation mount assembly wherein a spring thereof is compressed.

FIG. 19 is an exploded view of the isolation mount assembly.

DESCRIPTION

Figure 6:
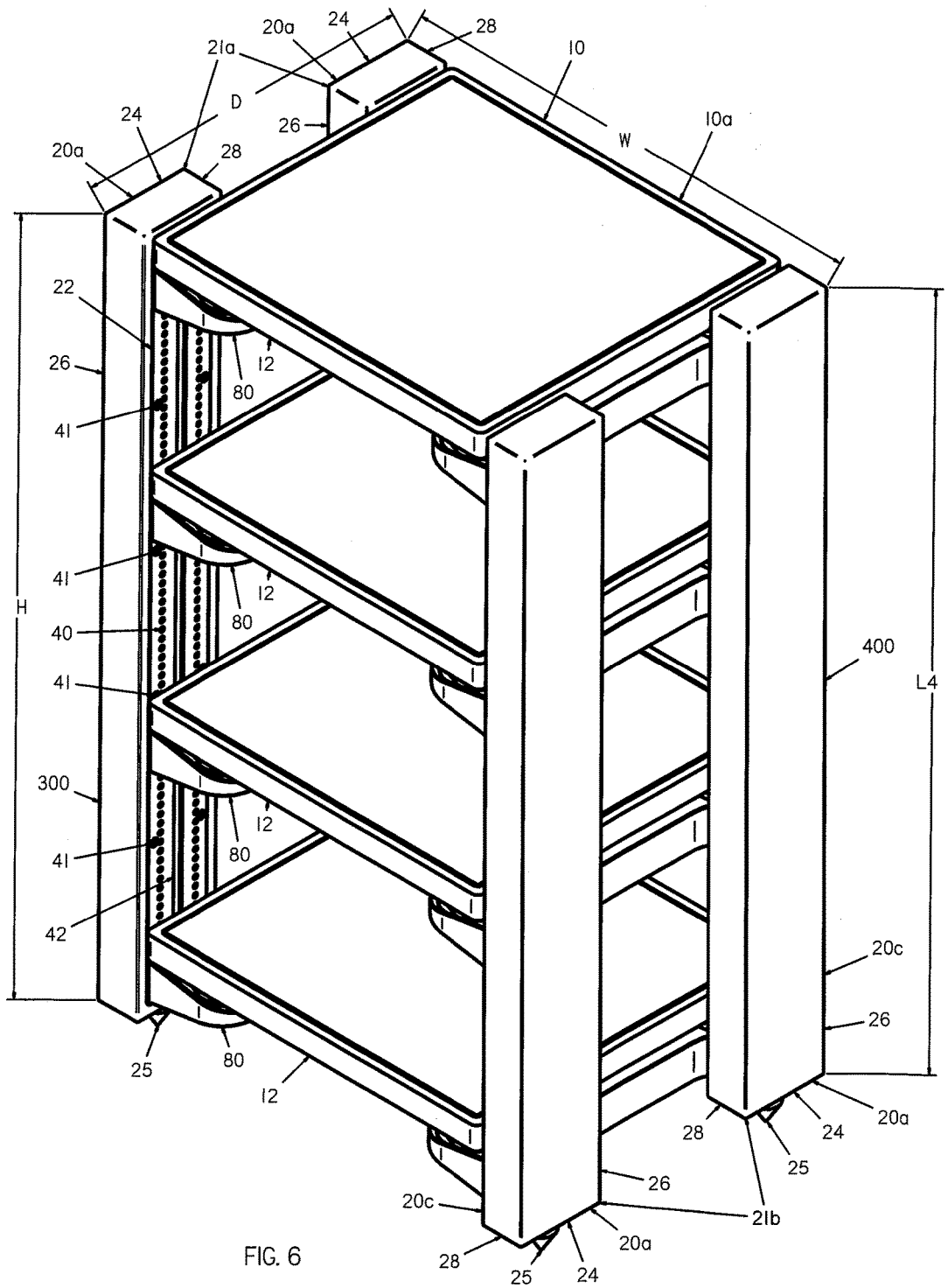
FIG. 6 is a perspective of a modular and reconfigurable stand having four shelves and having rectangular shaped legs.

At the outset, there is terminology used herein that is explained for the sake of clarity. These words are isolation and damping.

Isolation as used herein generally means creating a mismatch between the input (disturbing frequency) and the supported system natural frequency to reduce the transfer of energy. As will be described presently, there is a modular and reconfigurable high performance stand 10 (hereinafter referred to as stand 10). In one of the preferred embodiments, the stand 10 includes at cone member 179 (to be described presently) that is disposed between the legs of the stand 10 and a floor 181. The cone member 179 serves to isolate the legs of the stand 10 stand from low frequency vibrations (about a few hundred hertz or less) inputted from the floor. That is, the cone member 179 prevents low frequency energy from being transferred from the floor 181 to the stand 10, such that output from electronic equipment is not degraded.

Damping as used means to absorb some energy for each vibration cycle. Damping is used in this invention to minimize the vibration amplitude at resonance frequencies of the structure and to absorb energy as it moves from one location of the stand 10 to the other. Damping, for example damping provided by the dampers/damping materials used in the legs 20 and braces assemblies 80 of the stand 10, serves to dissipate energy as cycles of high frequency energy are inputted to the stand 10. In addition, damping may also be used on low frequency stage in base of stand to reduce the number of cycles required to bring input motion to rest.

The stands 10, 10a and 10b described herein are designed such that both isolation and damper capability thereof is optimized. Thus, any audio and/or electronic equipment supported on the stands 10, 10a and 10b produces optimal outputs.

As shown in FIGS. 1-5 there are modular and reconfigurable high performance stands 10 (sometimes referred to herein as stand 10) and having shelves 12 that support audio and electronic equipment 15. As will be described presently, the stand 10 is both easily reconfigurable and highly efficient as absorbing and damping both high and low frequency energy. Thus, the stand 10 is designed to support both electronic and audio equipment while at the same provides for optimal high and low frequency isolation and energy damping.

The stands 10 are capable of supporting from one to five shelves 12, and in other preferred embodiments may support more shelves 12. The stand 10 includes four legs 20. The lengths designated L1, L2, L3, L4 and L5 of the legs 20 is varied in FIGS. 1-5 such that the number of shelves 12 that can be supported can be varied. The stands 10 also have brace assemblies 80, to be described presently, that are supported by the legs 20.

It is pointed out that the shape of the legs 20 may be as described herein, and may also, in other preferred embodiments made to have any desired cross section, for example the legs may have an elliptical shaped cross section, circular shaped cross section, a triangular shaped cross section, a polygon shaped cross section or other cross section required as required for a particular application. In addition, the number of legs 20 may be may be varied from two or more legs.

Figure 7:
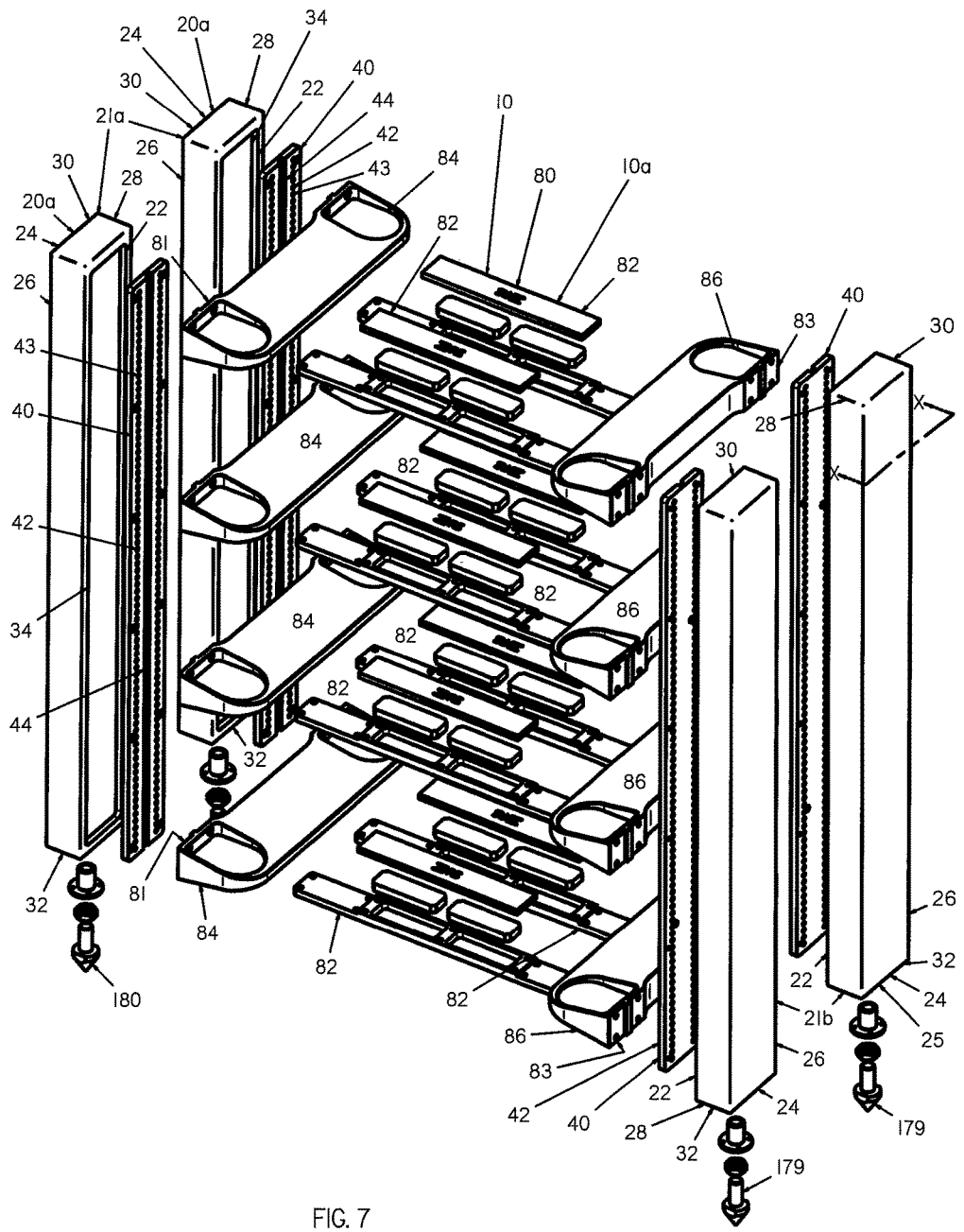
FIG. 7 is an exploded view of the modular and reconfigurable stand a leg of FIG. 6 wherein the shelves are absent.

As shown in FIGS. 6 and 7 there is another preferred embodiment of a modular and reconfigurable stand 10a. As shown, the stand 10a supports four shelves 12 and in this embodiment the legs 10 are embodied as rectangular shaped legs 20a, that is, they have a rectangular shaped cross section. The length designated L4 of the rectangular shaped legs 20a may be varied in other preferred embodiments such that the stand 10a is capable of supporting more or less than four shelves 12. Also shown in FIG. 6 are the three dimensions of the modular and reconfigurable stands 10 described herein, namely height designated H, depth designated D and width designated W.

FIG. 7 is an exploded view of the stand 10a wherein the shelves 12 that are supported by the stand 10a are absent. The stand 10a includes rectangular shaped legs 20a, bolt plates commonly designated 40, and brace assemblies commonly designated 80 and to be described presently.

As shown in FIGS. 6 and 7, each of the rectangular shaped legs 20a has opposed first and second sides 22, 24, opposed third and fourth sides 26, 28, and opposed proximal and distal ends 30, 32. The first sides 22 of the legs 20a define bolt plate recesses 34 sized to receive the bolt plates 40 therein. As shown in FIG. 6, the bolt plates 40 are joined or connected to the rectangular shaped legs 20a with, for example, screws or bolt plate bolts 41. The bolt plates 40 define plate openings 42, and the plate openings 42 are arranged parallel columns and spaced from one another. The bolt plate openings 42 are further defined by internal threads 43 formed in the bolt plate 40. The bolt plates 40 may be made of metal, plastic or wood. As shown in FIG. 8, the bolt plate 40 is fitted in the bolt plate recess 34 defined in the first side 22 of the rectangular shaped leg 20a and connected to the rectangular shaped leg 20a with bolt plate bolts 41, screws, friction fit of other suitable fasteners. As shown, the bolt plate 40 defines an alignment recess 44 that extends longitudinally along the rectangular shaped leg 20a. The alignment recess 44 is defined by a base wall 46 and a pair of opposed recess side walls 48, 50. Thus, the location of the bolt plate 40 the alignment recess 44 is fixed. It is pointed out that in the configuration shown in FIGS. 6 and 7 the rectangular shaped legs 20a are arranged in first and second leg pairs 21a, 21b. The first leg pair 21a faces the second leg pair 21b such that the bolt plates 40 supported by the first leg pair 21a faces the bolt plates 40 supported by the second leg pair 21b. As shown the first leg pair 21a supports a first end 81 one end of the brace assemblies 80 and the second leg pair 21b supports a second end 83 of the brace assemblies 80.

In addition, the rectangular shaped legs 20a may be variously embodied, for example solid as shown in FIG. 8 and made of plastic, metal, wood or other suitable material, or may be made of layers of these materials, for example layers of plastic. The rectangular shaped leg 20a serves to optimize stiffness and energy dissipation to enhance the stability of the stand 10a.

It is pointed out the legs 20 and rectangular shaped legs 20a are constructed to provide optimal stiffness and energy dissipation (over a wide frequency range), thus providing the stand 10 with optimal (and adjustable) level of damping.

FIG. 9 is a sectional view of another embodiment of the legs 20 wherein the legs are embodied as hollow legs 20b that defines a bolt plate recess 34 and sized to receive a bolt plate 40 therein as shown and fasteners, adhesives or a friction fit holds the bolt plate 40 in place. In this embodiment the hollow leg 20b is not solid. The hollow leg 20b has first and second internal walls 51a, 51b, that together with and outer housing 53 of the leg 20b define at least one internal cavity, with first, second and third 52, 54, 56 internal cavities shown in FIG. 9. The first, second and third 52, 54, 56 internal cavities extend longitudinally in the leg 20b. In one embodiment the leg 20b is hollow, that is, the first, second and third internal cavities 52, 54, 56 are hollow. In another preferred embodiment the first, second and third internal cavities 52, 54, 56 are entirely or partially filled with a damping material 57, for example sand, epoxy resin, and other suitable damping materials now known or developed in the future. This provides the hollow legs 20b with optimal stiffness and energy dissipation capability.

In another preferred embodiment shown in FIGS. 1A, 2A, 3A, 4A and 5A there are modular and reconfigurable stands 10a having one to five shelves 12 and brace assemblies 80 that support the shelves 12. The legs 20 are embodied as segmented legs 20c, and the segmented legs 20c are formed from leg segments commonly designated 60 such that the height of the modular and reconfigurable stands 10a can be readily increased or decreased by the addition or removal of leg segments 60.

Figure 10:
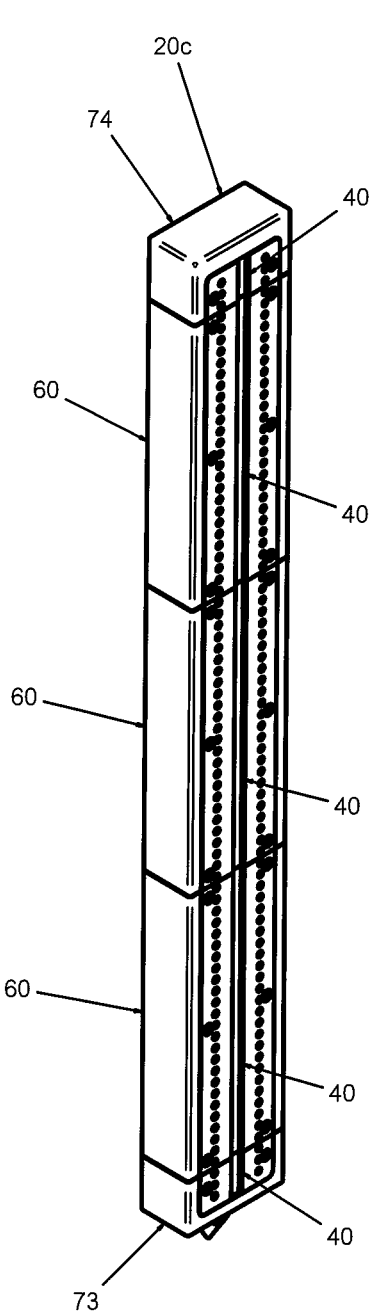
FIG. 10 is a perspective view of another preferred embodiment wherein there is a segmented leg.
Figure 11:
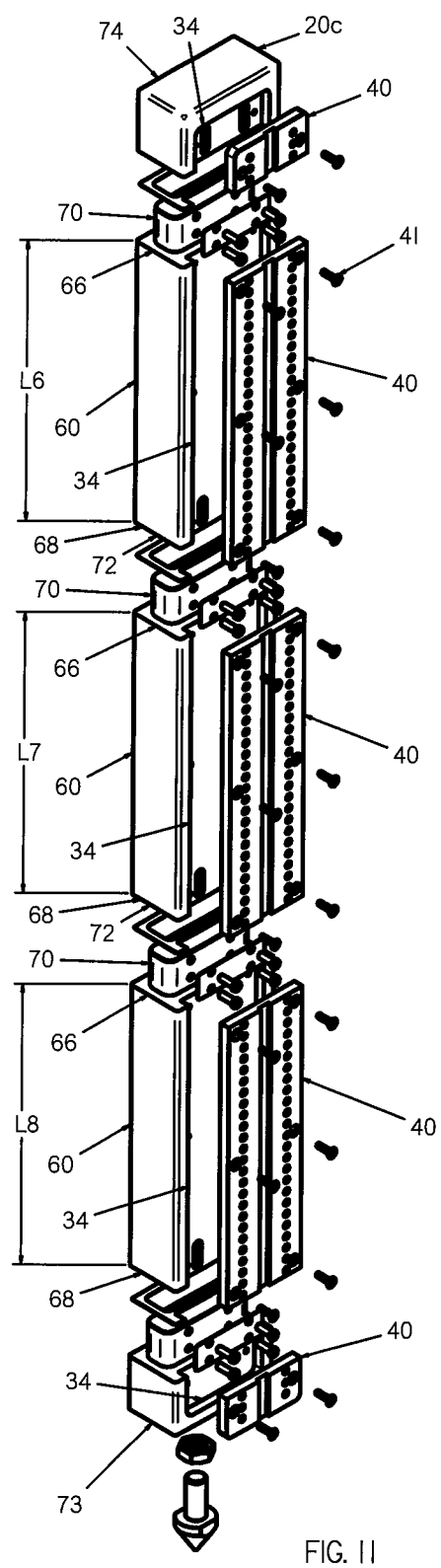
FIG. 11 is an exploded view of the leg shown in FIG. 10.

As shown in FIGS. 10 and 11 there is shown a segmented leg 20c and there are three leg segments 60 and the leg segments are stackable for use in a modular and reconfigurable stand 10b. The leg segments 60 are structurally identical, but may have different lengths designated L6, L7 and L8, respectively, and more or less than three leg segments may be used and the lengths of the leg segments 60 can be varied to accommodate and desired configuration. A segmented leg 20c can thus have a plurality of leg segments 60 and the leg segments 60 can have different lengths, the same lengths, or some may have the same length and others may have different lengths. Thus, the total length L9 (FIG. 10A) of the segmented leg 60 can be varied without limitation by the use of the leg segments 60. Each of the leg segments 60 has opposed first and second segment ends commonly designated 66, 68. Extending from each of the first ends 66 is an interlock protrusion 70 and defined in each of the second ends 68 is an interlock protrusion recess 72. The leg segments 60 can be stacked in virtually any desired configuration and to any desired height by moving the interlock protrusions 70 into the interlock protrusion recesses 72. There is also a protrusion cap 74 that can be fitted on any exposed interlock protrusion 72 opposed end plates 73 may be fastened to any exposed second ends 68 of the segmented legs 20c. Each of the leg segments 60 also defines a bolt plate recess 34 and supports a bold plate 40 in the bolt plate recess 34 the same manner are previously described. Thus, the user can readily reconfigure the height of the stand 10.

Figure 16:
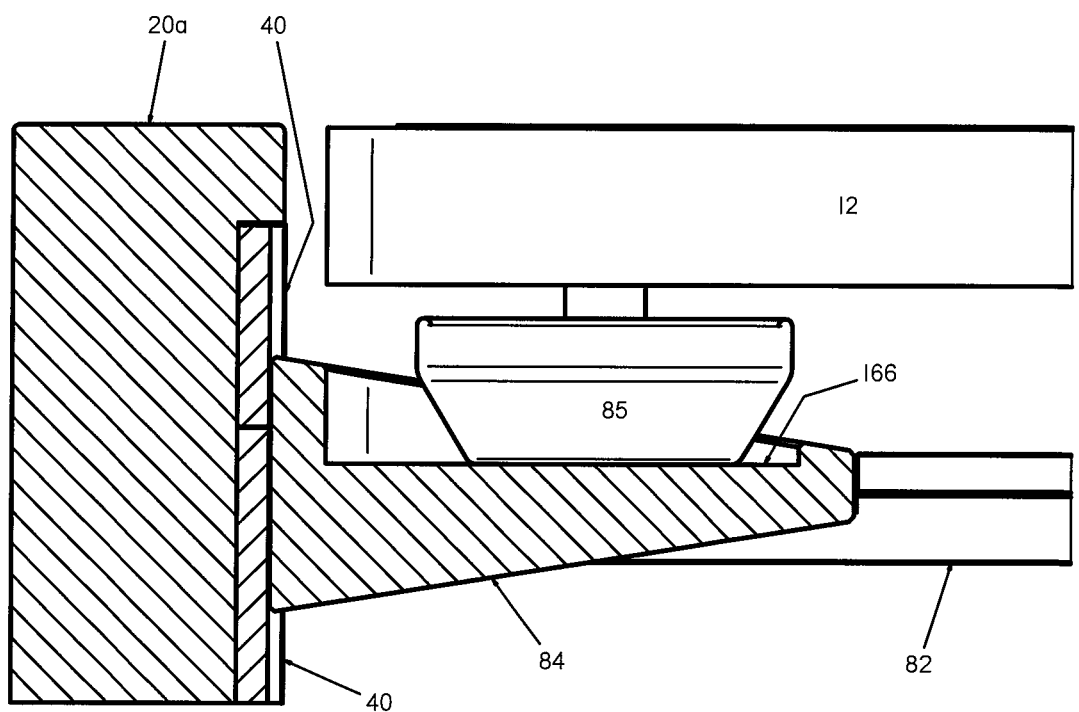
FIG. 16 is a sectional view showing a shelf supported on the brace member.

As shown in FIGS. 10A and 11B leg segments 60 are used to form segmented legs 20c that also include distal and proximal end segments 75a, 75b. As shown, each segmented leg 20c is formed from three leg segments 60 and a distal and proximal end segment 75a, 75b. The distal end segment 75a defines a distal end segment recess 76 that supports a bolt plate 40 therein and a distal end segment protrusion recess 77 adapted to receive an interlock protrusion 70. The proximal end segment 75b has an proximal end interlock protrusion 70 and defines a proximal end segment recess 76 that supports a bolt plate therein 40 therein. Also, fitted around each of the interlock protrusions 70 is a key lock 79 having a U-shape that is deposed between the leg segments 60, and the leg segments 60 and distal and proximal end segment 75a, 75b. The key lock 79 extends into the bolt plate openings 42 to provide for additional stability. As shown in FIG. 16G, there is an exploded view of a stand 10b having segmented legs 20c.

Figure 12:
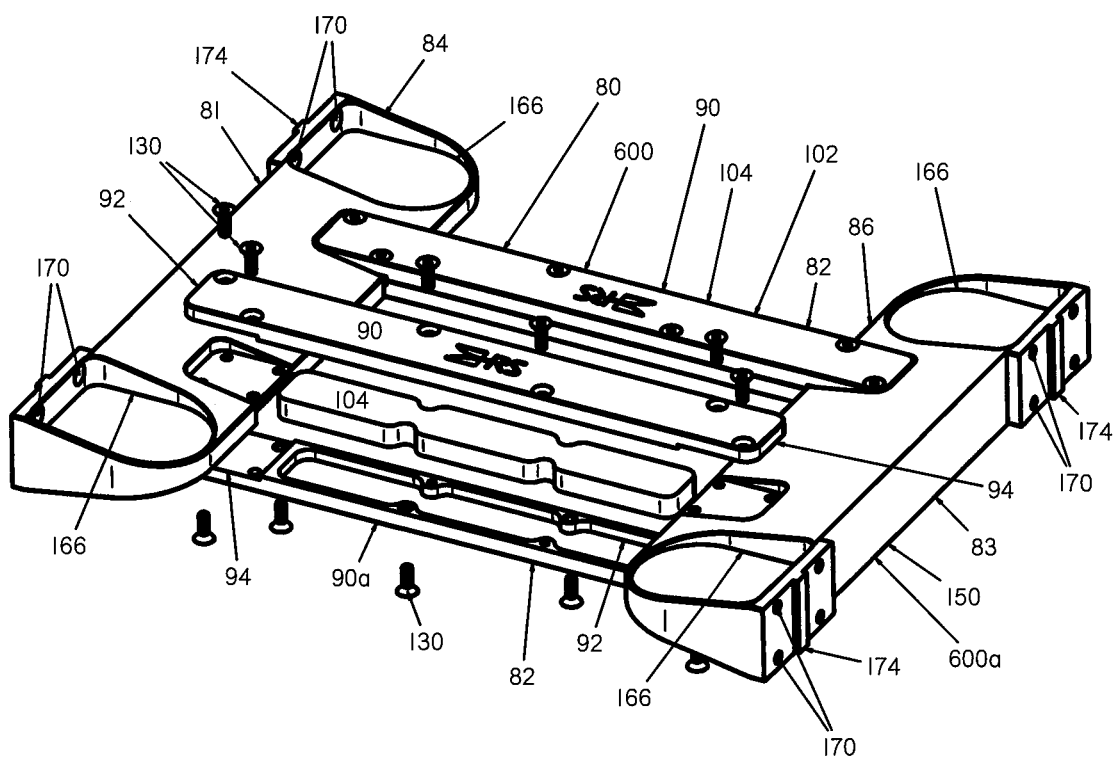
FIG. 12 is perspective view of a brace assembly.

As shown in FIG. 16G the segmented legs 20c used to form a stand 10b having segmented legs 20c. In the configuration shown in FIG. 16G the segmented legs 20c are arranged in first and second segmented leg pairs 60a, 60b. The first segmented leg pair 60a faces the second segmented leg pair 60b such that the bolt plates 40 supported by the first segmented leg pair 60a faces the bolt plates 40 supported by the second segmented leg pair 60b. The brace assembly 80 has opposed first and second brace assembly ends 81, 83 as shown in FIG. 12 that connect to the above-described bolt plates 40 and the first segmented leg pair 60a supports the first end 81 end of the brace assemblies 80 and the second segmented leg pair 60n supports the second end 83 of the brace assemblies 80.

It is pointed out that the use of the leg segments 60, that may have virtually any desired length, provides for vertical capability that is not dependent on the number of shelves that are utilized. The leg segments thus can accommodate an unlimited number of differently configured equipments set-up requirements and space constraints and requirements.

As shown in FIGS. 1-6 and 12, the modular and reconfigurable stands and 10 and 10a also include at least one brace assembly 80. The brace assembly 80 that is made of interchangeable components, such that a plurality of differently sized stands 10, 10a can be made with a minimal number of components. It is pointed out that in the past when a custom order had to be filled, a new stand had to be built from scratch. This is time consuming, costly, and inconvenient for the customer. As will be described presently, this issue is overcome by the use of a brace assembly 80 made of a minimal number of components of various sizes that can be made in advance and to satisfy virtually any custom order virtually immediately. This issue is also overcome by the use of the above-described leg segments 60 and other components described herein.

It is pointed out the brace assembly 80 is constructed to provide optimal stiffness and energy dissipation (over a wide frequency range), thus providing the brace assembly 80 with an optimal (and adjustable) level of damping.

The brace assembly 80 shown in FIGS. 12-16 includes one or more structurally identical cross damping support arms commonly designated 82. The brace assembly 80 also includes structurally identical first and second brace mounts 84, 86. The cross damping support arms 82 are connected to each of the first and second brace mounts 84, 86. The brace assembly 80 has opposed first and second brace assembly ends 81, 83 as shown in FIG. 12 that connect to the above-described bolt plates 40, and in particular the first brace assembly end 81 connects to the first leg pair 21a and the second brace assembly end 83 connects to the second leg pair 21b. This is shown in FIG. 7. The brace assembly 80 can be used with any of the legs described herein, because it is secured to bolt plates 40.

Figure 13:
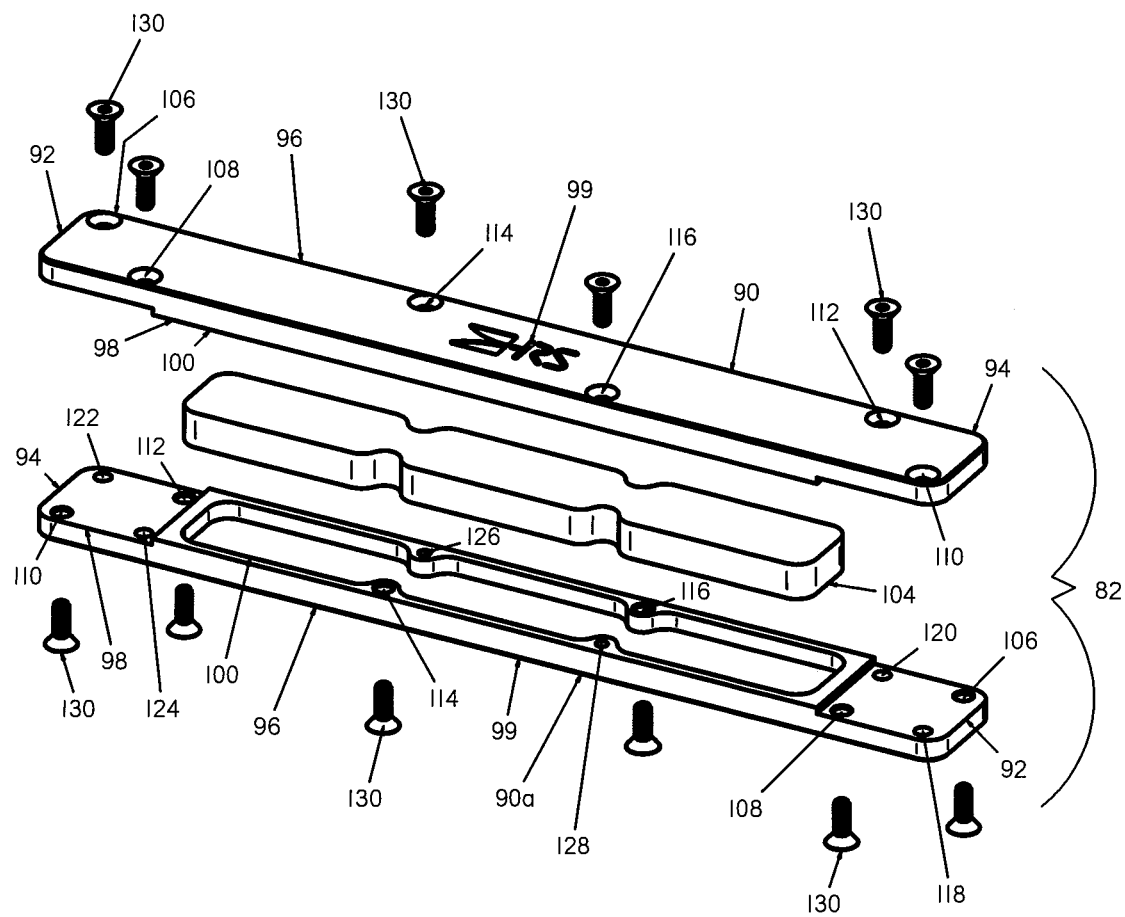
FIG. 13 is an exploded view of a cross damping support arm.

As shown in FIGS. 12 and 13, each of the cross damping support arms 82 includes first and second plates 90, 90a are structurally identical. As shown in FIG. 13, each of the first and second plates 90, 90a have opposed proximal and distal end portions 92, 94, and opposed first and second plate sides 96, 98 and a central portion 99. As shown, the second plate 90a is inverted and rotated 180 degrees relative to the first plate 90. Each of the first and second plates 90, 90a also defines a damper recess 100 that extends into the second plate sides 98. It is pointed out that when the first and second plates 90, 90a are brought together as shown in FIG. 12, the damper recesses 100 together define a damper cavity 102. A support arm damper 104 is provided and is shaped to fit in the damper cavity 102. The support arm damper 104 contacts the first and second plates 90, 90a such that the cross damping support arm 82 can dampen vibrations when they are brought together, as will be described presently. The support arm damper 104 is made of epoxy, resins, plastic or any other suitable damping material now known or developed in the future.

In addition, as shown in FIG. 13, each of the first and second plates 90, 90a defines proximal end portion fastener openings 106, 108 that are offset from one another, distal end portion openings 110, 112 that are offset from one another, and central openings 114, 116 that are offset from one another. The proximal end portion 92 has offset internally threaded recesses 118, 120, and the distal end portion 94 has offset internally threaded recesses 122, 124, and the central portion 99 has offset internally threaded recesses 126, 128. Arm fasteners 130 are also provided.

Figure 14:
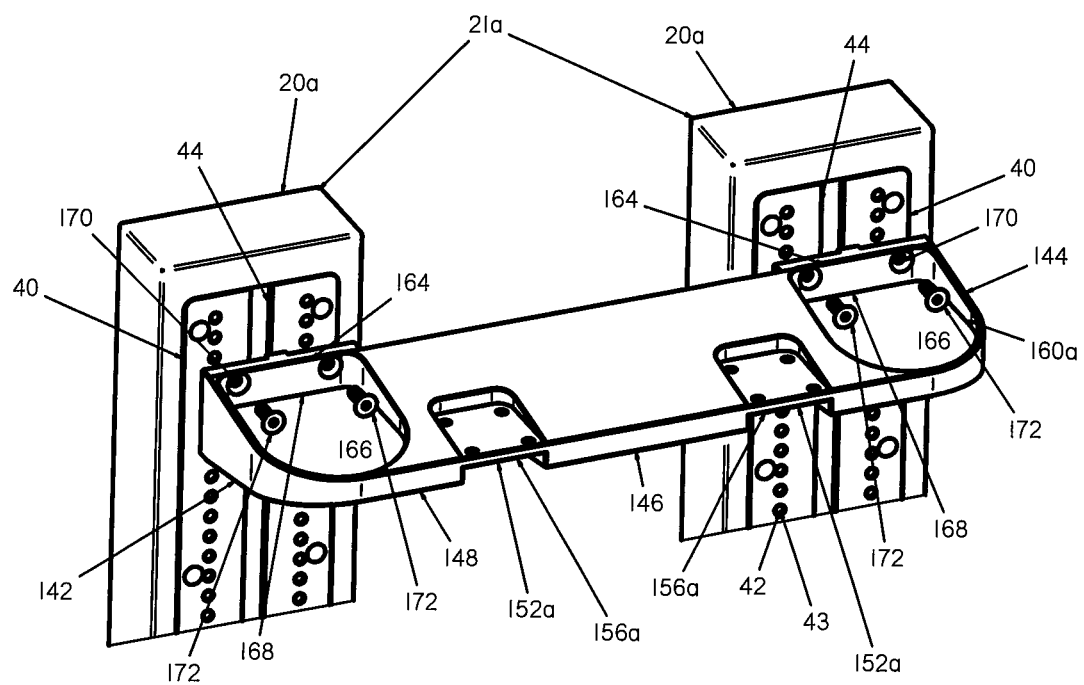
FIG. 14 is a perspective view of a mounting brace member connected to legs.

As shown in FIG. 12 the cross damping support arms 82 connect to the first and second brace mounts 84, 86. The first and second brace mounts 84,86 are structurally identical. As shown in FIG. 14, first brace mount 84 has opposed first and second ends 140, 142, opposed first and second sides 144, 146, and opposed support arm and leg sides 148, 150. Extending into each of the opposed first and second sides 144, 146 are cross damping support arm recesses designated 152, 152a. The cross damping support arm recesses 152, 152a are each defined by a surrounding surface 154, 154a that extends from the opposed first and second sides 144, 146 into the first brace mount 84. The cross damping support arm recesses 152, 152a are also each defined by a support surface 156, 156a that meets with the surrounding surfaces 154, 154a, respectively. Brace openings commonly designated 158 extend through the first brace mount 82 such that they extend though the support surfaces 156, 156a.

The brace assembly 80 also includes first and second brace mounts 84, 86. The cross damping support arms 82 are connected to the first and second brace mounts 84, 86 as shown in FIG. 12 with the arm fasteners 130. In particular, the first and second plate 90, 90a are moved together such that the proximal and distal end portions 92, 94 abut the support surfaces 156, 156a of the first and second brace mounts 84, 86. At the same time, the support arm damper 104 is disposed between the first and second plates 90, 90a. Then the arm fasteners 130 are extended though the proximal end portion fastener openings 106, 108, the distal end portion openings 110, 112 and the brace openings 158, and arm fasteners 130 are extended through the central openings 114, 116. The arm fasteners 130 are tightened and the cross damping support arm 82 is thus secured to the first and second braces 84, 86 with the support arm damper 104 abutting the first and second plates 90, 90a. The first and second braces 84, 86 are and the cross damping support arms 82 are stiffly connected thus limiting and/or eliminating any movement of the first and second braces 84, 86 relative to any movement of the cross damping support arms 82. This assists the stand 10, 10a with damping high frequency energy.

The first and second braces 84, 86 also each define load receiving recesses 160, 160a that are defined by a surrounding surface 164 that extends to a load surface 166. The load surface 166 is capable of supporting loads imposed by shelves 12 and the like. The surrounding surface 164 is defined, in part, by a flat surface portion 168 that itself defines plate bolt openings 170. The plate bolt openings 170 are sized to receive plate bolts 172.

Figure 15:
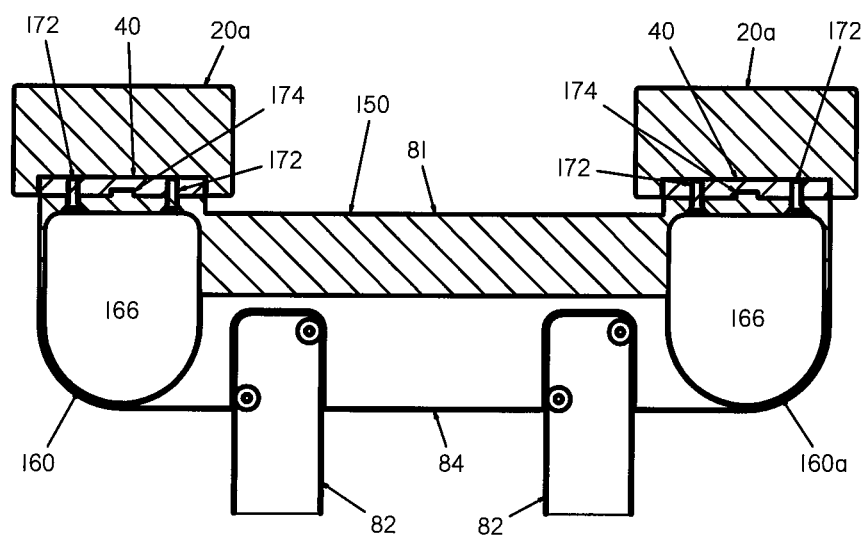
FIG. 15 is a top view of the mounting brace connected to the legs.

In addition, as shown in FIG. 12 extending from the leg side 150 of the first brace 84 are interlock protrusions 174 that are adapted to fit in the an alignment recess 44 defined in the bolt plate 40 in a close fitting relationship as shown in FIG. 15. When the plate bolts 172 are threaded through the first brace member 82 and into the bolt plate 40 the interlock protrusion 174 is drawn tight into the alignment recess 44, thus fixing the position of the first brace 82 to the bolt plate 44 and thus leg 20a. This rigid connection increases the ability of the stand 10a to absorb high frequency energy waves as compared to other stands currently available. This configuration also controls the angular momentum of the stand 10a. FIG. 16 shows a sectional view wherein the leg 20a supports the first brace 84 and the first brace 84 supports an isolator or damper element 85 on its load surface 166, and a shelf 12 is supported on the isolator element 85.

It is pointed out that the frame design of the above-described stand 10a is thus optimized to improve performance of broadband isolation base at the interface between brace assemblies 80 and the shelves 12. In other preferred embodiments a user may dispose the shelf 12 directly on the brace assembly 80.

Figure 16A:
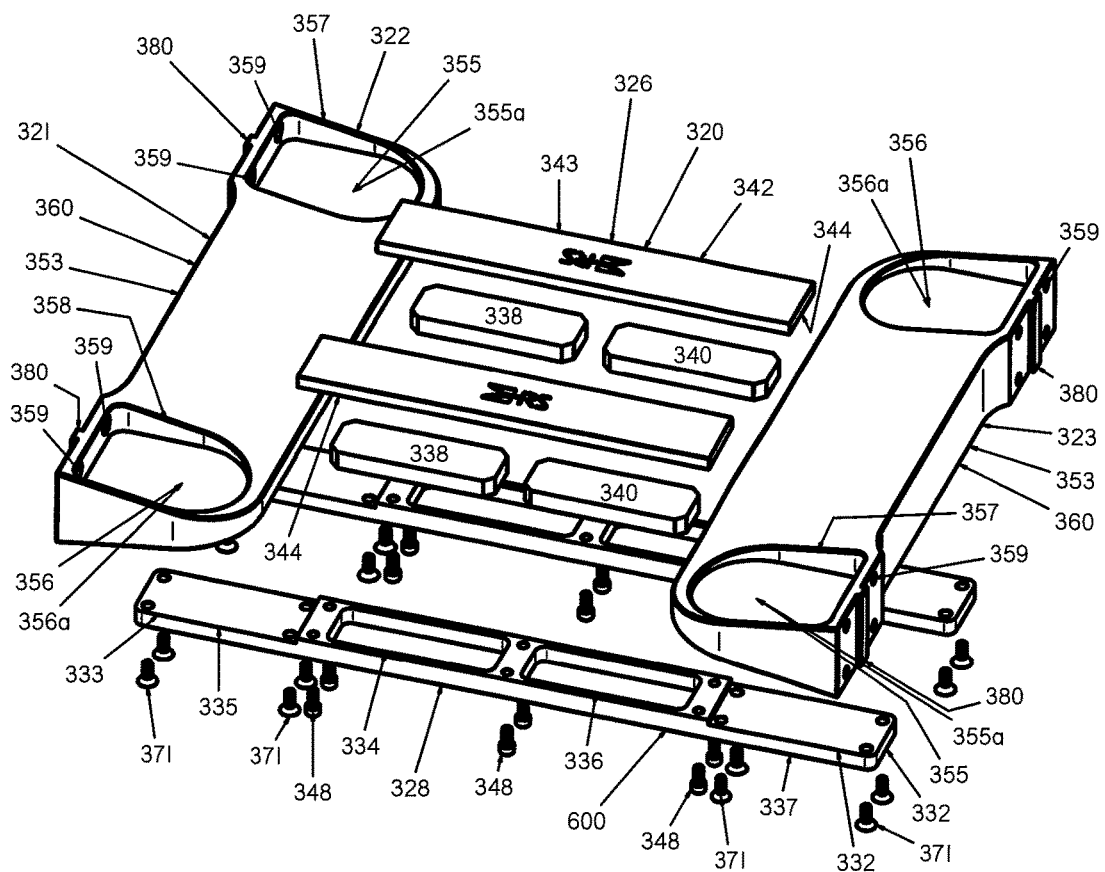
FIG. 16A is exploded view of another preferred embodiment wherein there is a double damper brace assembly.

In another preferred embodiment shown in FIGS. 16A-16F there is there is double damper brace assembly 320 that replaces the above-described brace assembly 80. As shown in FIG. 16A, there is an exploded view of the double damper brace assembly 320.

Figure 16B:
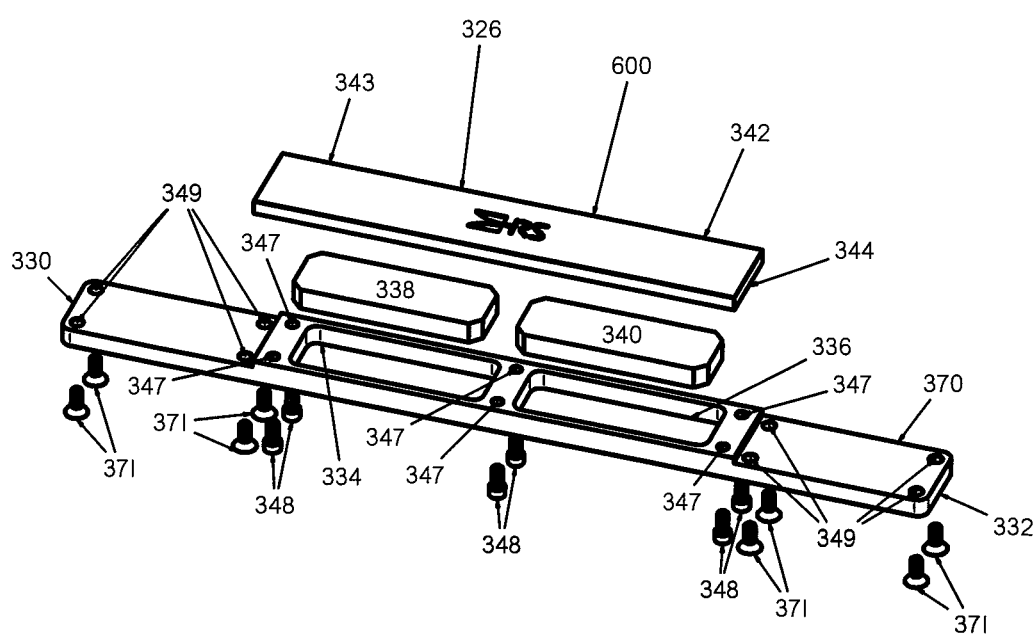
FIG. 16B is an exploded view of a cross double damper support arm.

The double damper brace assembly 320 has opposed first and second double damper brace ends 321, 323. The double damper brace assembly 320 has opposed first and second double damper brace mounts 322, 324 that are structurally identical, and has structurally identical cross double damper support arms 326, 328. As shown in FIGS. 16A and 16B, each of the cross double damper support arms 326, 328 has a first and second double damper support arm ends 330, 332 and first and second damper recesses 334, 336, and opposed first and second double damper support arm sides 335, 337. The first and second damper recesses 334, 336 extend inwardly from the first damper side 335. Each of the cross double damper support arms 326, 328 also includes first and second dampers 338, 340 that are identical in one of the preferred embodiments and a damper cover plate 342. The first damper 338 is disposed in the first damper recess 334, and the second damper 340 is disposed in the second damper recess 336. A damper cover plate 342 having opposed first and second damper cover plate sides 343, 344 is provide, and the damper cover plate 342 has internally threaded bores 345 that extent into the second damper placate cover side 344 (as indicated by the dashed circles show in the damper cover plate 342 in FIG. 16B). Damper plate bolts 348 are provided and the first cross double damper support arm 326 defines damper support arm openings 347. The damper plate bolts 348 extend through the damper double damper support arm openings 347 and thread to the internally threaded bores 345 of the cover damper cover plate 342. The first and second dampers 338, 340 are thus secured in the first cross double damper support arm 326 in this manner and they may be made of any of the previously described damper materials. The first cross double damper support arm 326 also has connection bolt openings 349 that are formed in the distal end portions 370 of the first cross double damper support arm 326. The second cross double damper support arm 328 is structurally identical to the first cross double damper support arm 326. Also shown are brace bolts 371.

Figure 16C:
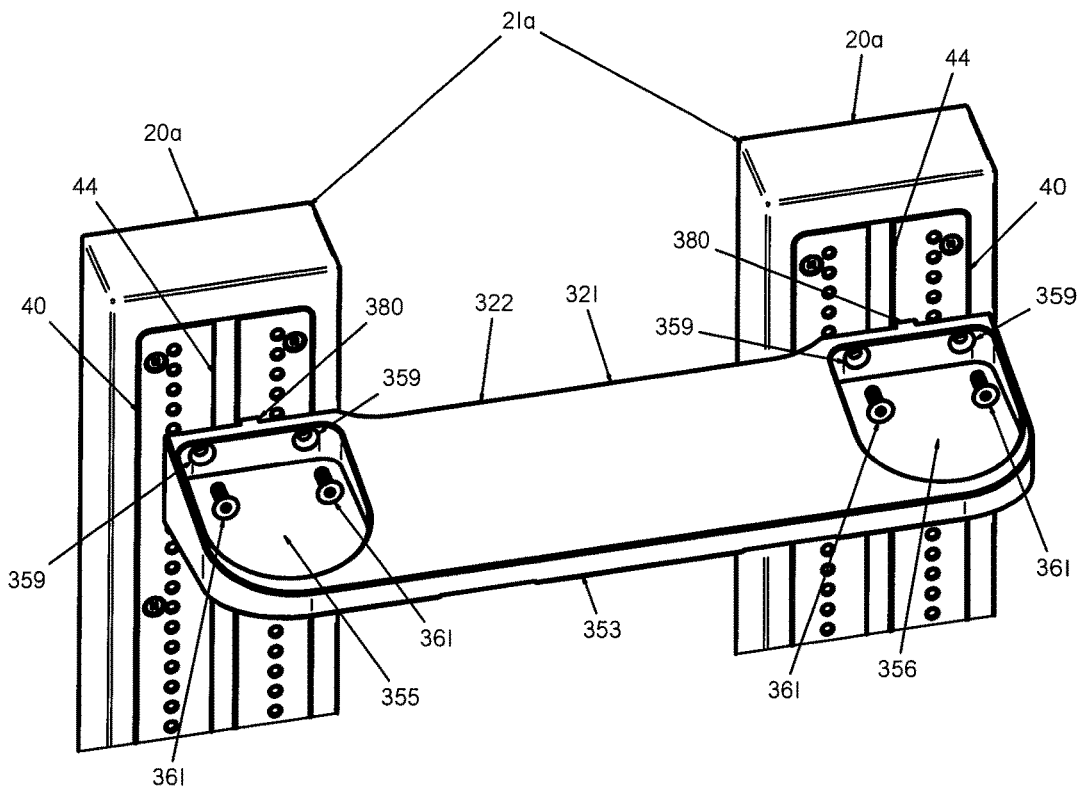
FIG. 16C is a top view of a double damper brace.

The double damper braces 322, 324 are structurally the same, and the double damper brace mount 322 has opposed first and second double damper brace sides 353, 354. The first double damper brace side 353 defines first and second support recesses 355, 356 that are defined by surrounding walls 357, 358 that define first double damping brace openings commonly designated 359 sized so that brace bolts 361 (FIG. 16 C) can be accommodated by the brace bold openings 359. The first and second support recesses 355, 356 are also defined by load surfaces 355a, 356a (FIG. 16A) that are adapted to receive isolators 85 as previously described. The double damper brace mount 322 also has a leg side 360 from which extend interlock protrusions 380 that are adapted to fit in the an alignment recess 44 defined in the bolt plate 40 in a close fitting relationship as shown in FIGS. 16C and 16D, and held in place with the brace bolts 361 that are extend through the brace openings 359 and threaded to the bolt plate 40.

Figure 16D:
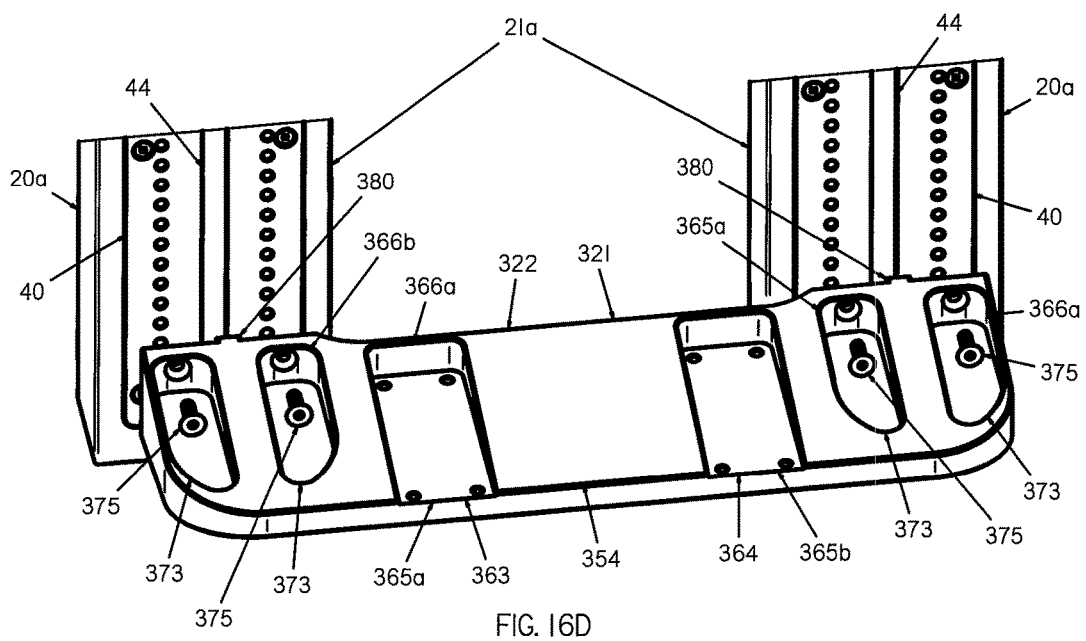
FIG. 16D is a bottom view of the double damper brace.
Figure 16E:
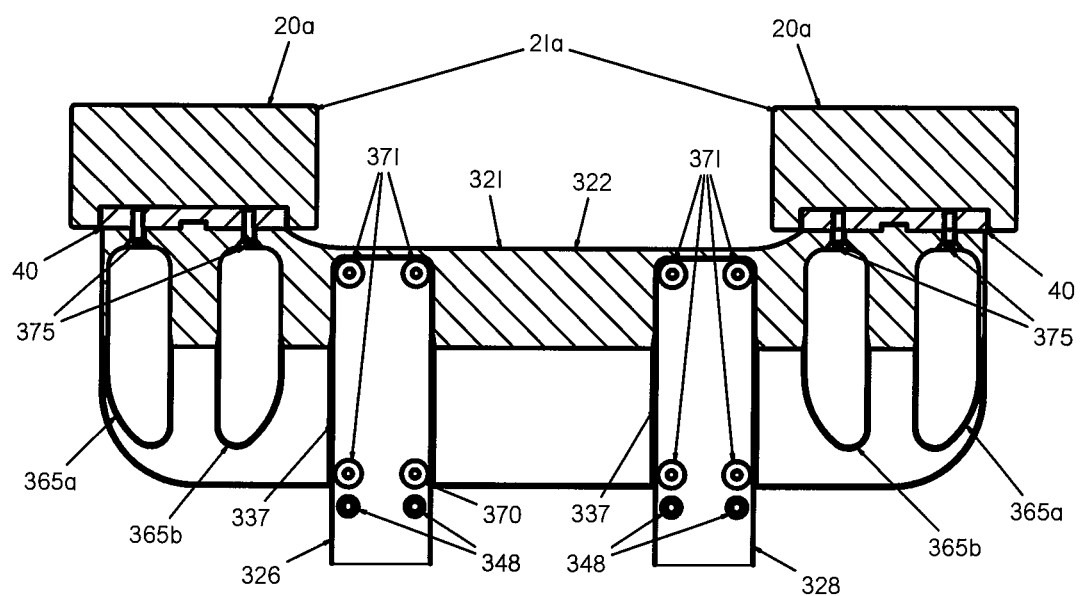
FIG. 16E is a bottom view of the double damper brace wherein the double damper brace is connected to cross double damper support arms.
Figure 16F:
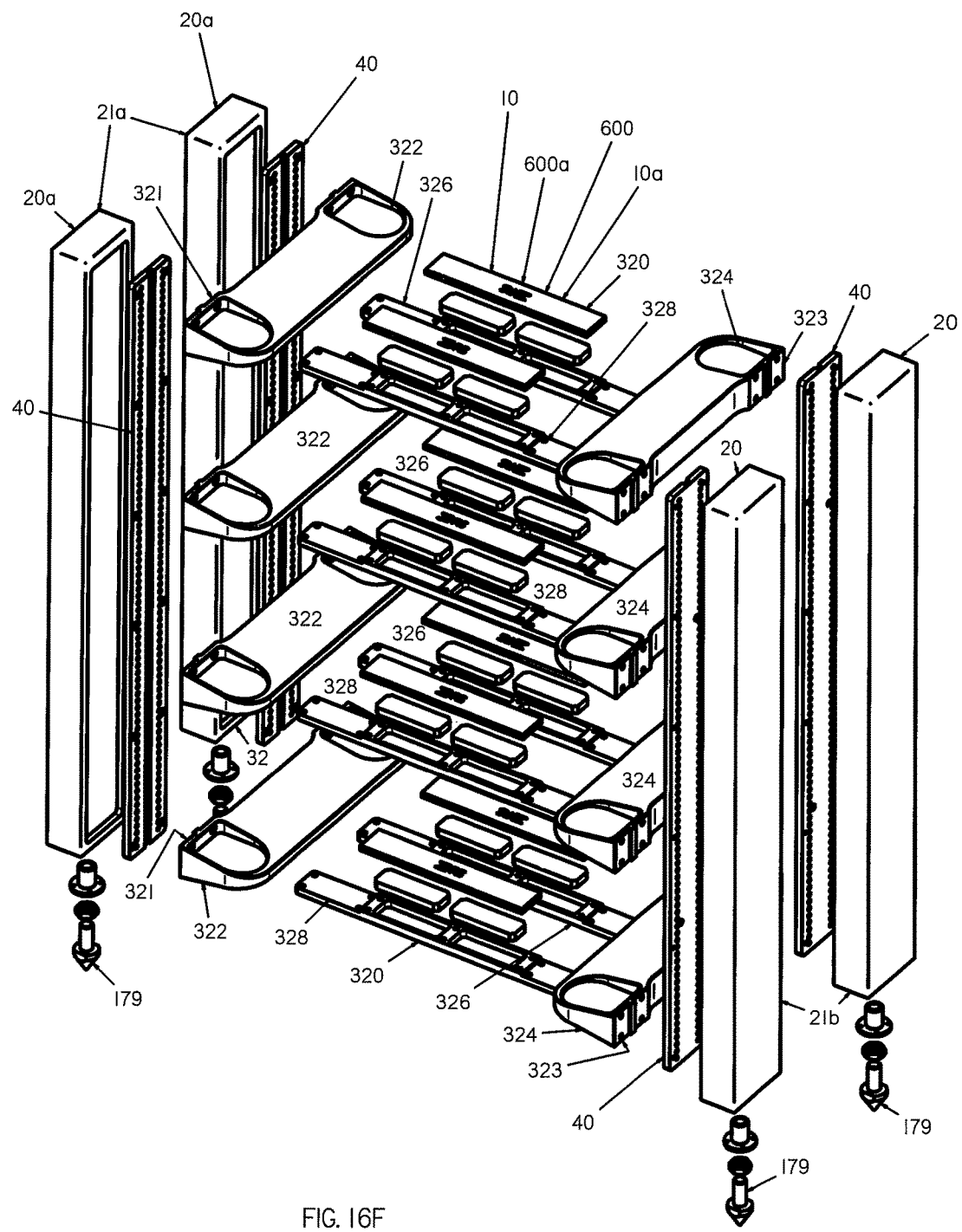
FIG. 16F is an exploded view of a stand having rectangular shaped legs for supporting the double damper brace assemblies.
Figure 16G:
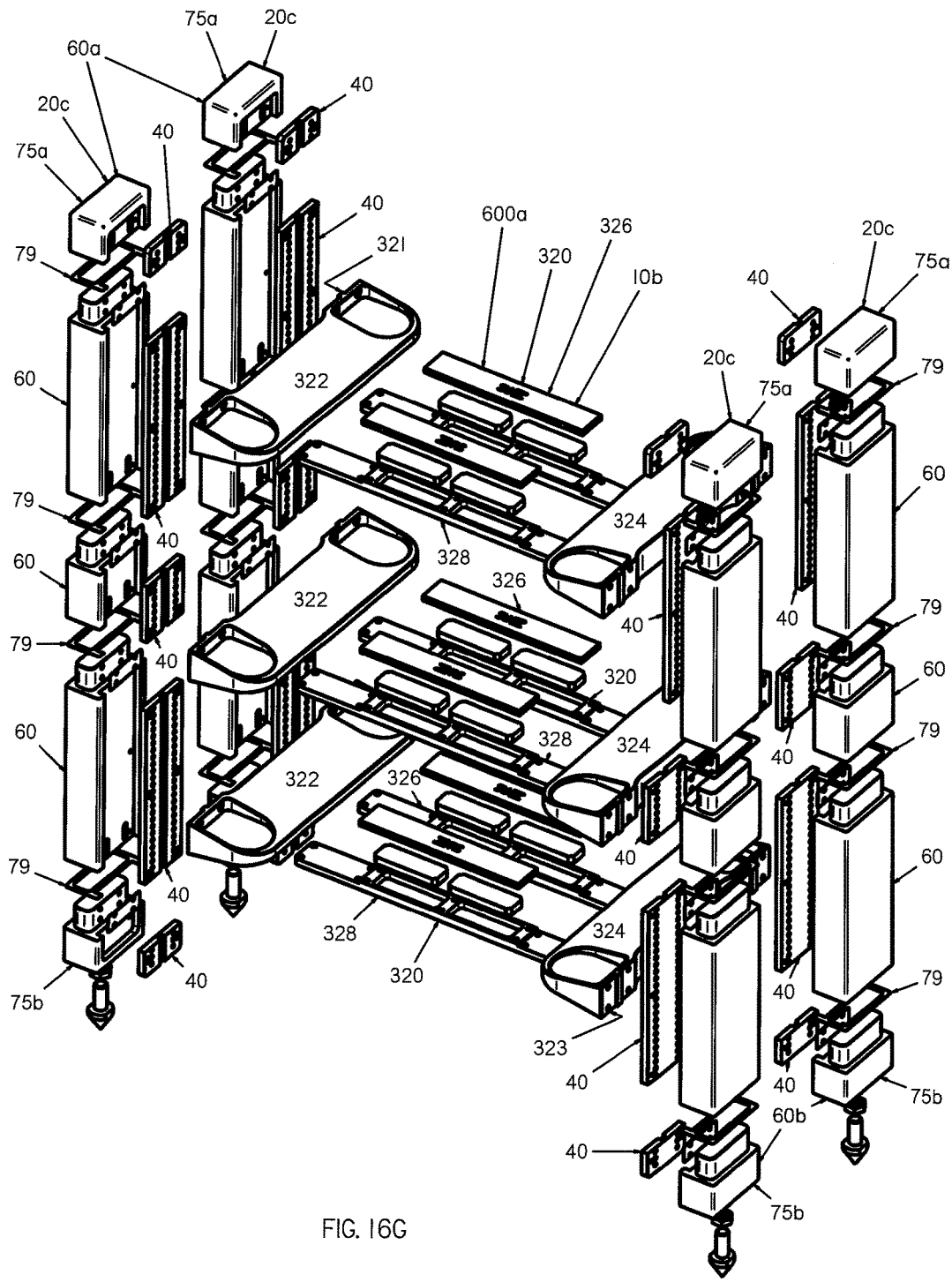
FIG. 16G is an exploded view of a stand having segmented legs for supporting the double damper brace assemblies.

FIG. 16D is a bottom view of the double damper brace 322 and as shown it defines two double damper arm recesses 363, 364 sized to receive the cross double damper support arms 326, 328 therein as shown in FIG. 16E. The double damper arm recesses 363, 364 are each defined by a brace base walls 365a, 365b and a brace surrounding walls 366a, 366b. The cross double damper support arms 326, 328 are disposed in the double damper arm recesses 363, 364, respectively, and secured in place with brace bolts 371. In addition, FIG. 16E shows the double damper brace 322 also defines support bolt recess commonly designated 373. Plate bolts 375 are disposed in the support bolt recess commonly designated 373 and extend through the double damper brace 322 and into the bolt plate 40. The bolt plate 40 is secured to the rectangular shaped legs 20a and the double damper brace mounts 322, 324 are secured to the rectangular shaped legs 20a. FIG. 16F is an exploded view of the above described double damper brace assemblies 320 used in connection with a modular and reconfigurable stand 10a having rectangular shaped legs 20*a*. FIG. 16G is an exploded view of the above described double damper brace assemblies 320 used in connection with a modular and reconfigurable stand 10*b* wherein the stand 10*b* has segmented legs 20*c* and upper and lower end segments 75*a*, 75*b*.

In FIG. 16F the stand 10*a* has rectangular shaped legs 10*a* and the rectangular shaped legs 20*a* are arranged in first and second leg pairs 21*a*, 21*b* and the first double damper brace end 321 is bolted to the bolt plates 40 supported by the first leg pair 21 and the second double damper brace end 323 bolted to the bolt plates 40 supported by the second leg pair 23. In FIG. 16G the stand 10*b* has segmented legs 60 that are arranged in first and second segmented leg pairs 60*a*, 60*b*, and the first double damper brace end 321 is bolted to the bolt plates 40 supported by the first segmented leg pair 60*a* and the second double damper brace end 323 bolted to the bolt plates 40 supported by the second segmented leg pair 23.

In another preferred embodiment, the brace assembly 80 includes only one cross damping support arms 82 that may be centered relative to the first and second brace mounts 84, 86. Or, more than two one cross damping support arms 82 may be connected to the first and second brace mounts 84, 86 in the manner described above. Likewise, the first and second brace mounts 84, 86 may have one, two or more than two load receiving recesses 160. Similarly, the double damper brace assembly 320 may be made with only one double damper brace 322 and one of the cross double damper support arms 326 and may have one or more than one support recesses 355.

In other preferred embodiments, the lengths of the cross damping support arms 82, brace mounts 84, 86, double damper braces 322, 324 and cross double damper support arms 326, 328 may be pre-established and these components may be pre-made. It is pointed out that a single first component 600 (which defined as either the cross damping support arm 82 shown in FIG. 12 or the cross double damper support arm 326 shown in FIG. 16A) controls the width W of any of the stands described herein 10, 10*a*, 10*b*, and a single second component 600*a* (which is defined as one of the first and second brace mounts 84, 86 shown in FIG. 12 or one of the first and second double damper brace mounts 322, 324 shown in FIG. 16A) controls the depth D of the stand 10, 10*a*, 10*b*. Thus, a first single component controls the width W of any of the stands described herein, and a second single component controls the depth D of any of the stands described herein and these component can be made to have any desired length. In addition, the legs 20, rectangular shaped legs 20*a*, hollow legs 20*b* and segmented legs 20*c* made of leg segments 60 having virtually any desired length control the height of the stands. This provides a vendor with the ability to create in real time a custom stand for a customer, thus eliminating the time and costs associated with building a stand from scratch. For example, maintaining an inventory of first components 600 such as cross damping support arms 82 and cross double damper support arms 326 in the lengths of, for example, 17, 19 and 23 inches and an inventory of first and second brace mounts 84, 86 and first and second double damper brace mounts 322, 324 in lengths of, for example, nineteen, twenty-one and twenty three inches provides the vendor with an great number of stand size configurations. In addition maintaining an inventory of second components 600*a* such as leg segments 60 of differing lengths provides the vendor with the ability of the vendor to create a custom stand in a minimal amount of time. Thus, the vendor or manufacturer can increase production and profits as compared to past methods of creating custom stands for audio and electronic equipment. In addition, it is pointed out that all three degrees of freedom relative to height H, width W and depth D can be changed by changing one of the first and second components 600, 600*a* described immediately above. For example, with a stand 10*a* having a segmented leg 20*c* the vertical capacity of the segmented leg 20*c* can be adjusted at anytime and as desired independent of the shelf quantity and dependent of shelf location by installing or removing additional leg segments 60 of a desired length.

In order to provide for low frequency damping the above-described legs they may have low frequency isolation mount assemblies 180 as shown in FIGS. 17-19 that are disposed in the distal leg ends, commonly designated 25 throughout the drawing figures. For example, in one preferred embodiment one or more of the rectangular shaped legs 20*a* or segmented legs 20*c* is be equipped with a low frequency isolation mount assemblies 180 at the interface with the floor 181 that target low frequencies. The low frequency isolation mount assemblies 180 may be used to support any of the stands described herein, or in other words, the legs 20, rectangular shaped legs 20*a*, hollow legs 20*b* and segmented legs 20*c* may include low frequency isolation mount assemblies 180 that support said legs.

The isolation mount assemblies 180 controls and decreases the vertical movement of the stand 10 indicated by arrows designated A and B in FIG. 17. The isolation mount assemblies 180 prevent the transfer of energy, for example low frequency floor vibrations inputted from the floor 181, to any of the legs described herein. In other preferred embodiments, the floor 181 may virtually any support surface that supports the isolation mounts 180, that in turn, supports the rectangular shaped legs 20*a* and segmented legs 20*c* or any of the legs described herein. As discussed above, due to the rigid construction of the stand 10, 10*a*, 10*b* the high frequency damping is accomplished by the above-described structure of the stand 10, 10*a*, 10*b* whereas the low frequency isolation of the stands accomplished its low frequency isolation mount assemblies 180.

The isolation mount assembly 180 includes a mount housing 184 that defines a rod opening 186 and an opposed bearing recess 188. The mount housing 184 has an internal spring bearing surface 190. A bearing 192 is disposed in the bearing recess 188. A spring rod 194 is disposed in the mount housing 184 and the spring rod 192 has a compression ring 196. A spring 198 that is a low frequency spring in one of the preferred embodiments is provided, and the spring 198 is positioned around the spring rod 194. The spring 198 is positioned between the compression ring 196 and the spring bearing surface 190 of the housing 184. The spring rod 194 has an internally threaded portion 200 that is adapted to thread to a cone element 202 that has an externally threaded extension 204, and a lock nut 206 is threaded to the cone element 202. The spring rate of the spring 198 may be selected by the user. In addition, the stands described herein are capable of being leveled by the user by rotating the cone element 202. Thus, when low frequency vibrations, for example at a frequency of less than 20 hertz are transmitted to the cones though the floor 181, the isolation mount assemblies 180 will not allows the energy from such frequencies to be transferred to the legs 20*a*. The isolation mount assemblies 180 also serve to restrict the movement of the legs 20*a*, and thus the stand 10, to one degree of freedom, namely the upward or downward vertical range of movement.

Figure 20:
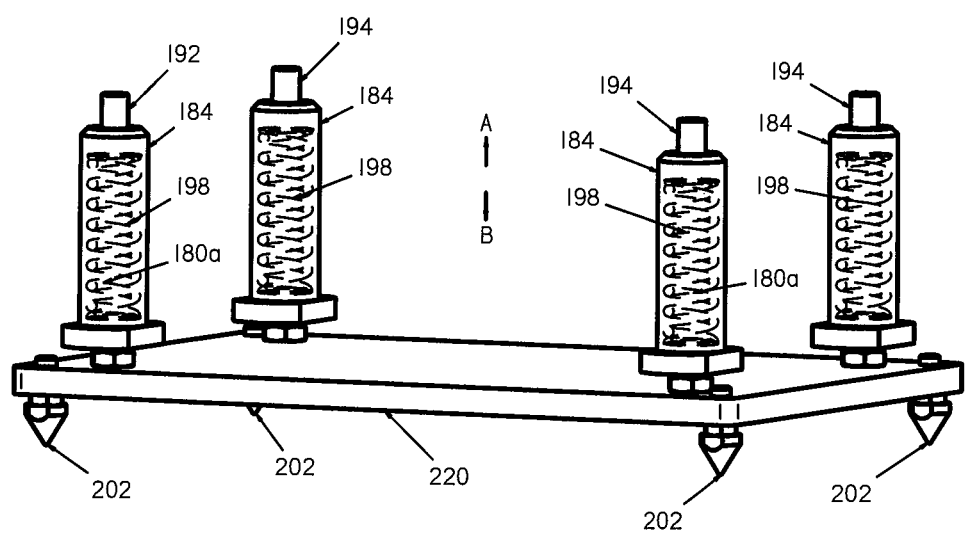
FIG. 20 is a front view of a mounting plate for use in the modular and reconfigurable stand wherein the mounting plate supports isolation mount assemblies.

In another preferred embodiment shown in FIG. 20, there is provided a mounting plate 220 and the above-described mount housings 184 of isolation mount assemblies are disposed in the legs described herein. The legs are supported on the isolation mount assemblies 180a as shown. The isolation mount assemblies 180a are the same as the above-described isolation mount assemblies 180, but the cone elements 202 are moved and support the mounting plate 220. The cone elements 202 are treaded to and adjustable relative to the mounting plate 220 for leveling of any stand described herein supported thereon. As shown, the spring rods 194 and springs 198 are disposed in the mount housings 184, and the mount housings 184 support the legs 20a such that the springs 198 are permitted to move compress and expand in the directions of arrows designated A and B. This limits the movement of the stand 10 to one degree of freedom, while at the same time isolating the legs 20, rectangular shaped legs 20a, hollow legs 20b and segmented legs 20c from the ground 181. Thus the only path for low frequency energy transfer from the ground 181 to the stands is by way of the springs 198.

Figure 21:
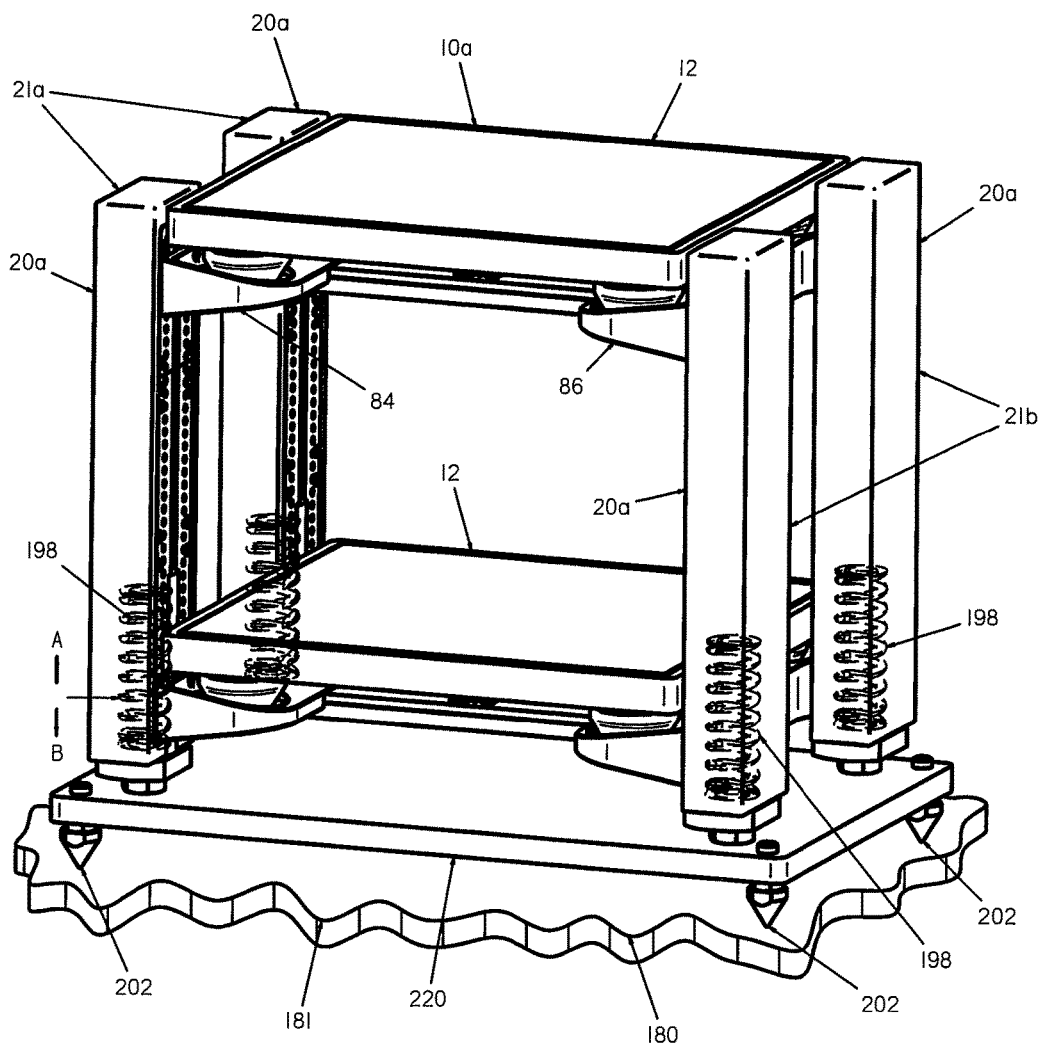
FIG. 21 is a front view of a modular and reconfigurable stand that includes the isolation mount assemblies disposed in the legs of the stand.

In addition, the mounting plate 220 connected to the low frequency isolation assemblies 180a further restricts the stands 10, 10a, 10b from swaying when it is subjected to low frequency floor input energy and also serves to stiffen them and thus reduce the impact of high frequency energy. FIG. 21 is a front view of a modular and reconfigurable stand 10a having rectangular shaped legs 20a that includes the isolation mount assemblies 180 disposed therein and the cone elements 202 are supported on the ground 181.

It is to be understood that the above-described spring 194 of the isolation mount assembly 180 in any of the embodiments described anywhere herein can be otherwise embodied. For example, the spring 194 and isolation mount assembly 180 may be embodied as an air springs, elastomer-type springs, metal spring washers, spring washers made of plastics and other suitable materials and other suitable springs or spring acting components now know or developed in the future. These may all be used to provide for the low frequency damping and for allowing one degree of freedom.

In another preferred embodiment, the above described legs 20, rectangular shaped legs 20a, hollow legs 20b and segmented legs 20c are directly mounted to the floor 181 with the use of, for example, a threaded spike.

In addition, there can be one (1) or more low frequency isolation stages at interface of the stand 10 with floor 181 with resonant frequency below about a few hundred hertz.

In another preferred embodiment isolation mount assemblies 180 allow for independent acting feet where relative motion at the front 300 and the rear 400 (see FIG. 6) of stand 10 is the optimal solution, so that stand 10a will have different relative motion at each of the isolation mount assemblies 180. The degrees of freedom of the stand 10a can be selectively controlled at the rectangular shaped legs 20a by constraining or tying two or more of the above described legs together such that their isolation mount assemblies 180 operate or function together. For example, two adjacent rectangular shaped legs 20a may need to move together due to the location of the stand 10 in a room and thus are selectively tied to one another. This allows the stand 10 to have two or more degrees of freedom when desired or required for a particular application. At the same time, the isolation mount assemblies 180 are capable of providing for more than one degree of freedom. Thus, the response of the system can be controlled through or with these degrees of freedom.

Another preferred configuration would be one or more of the isolation mount assemblies 180 have restricted motion so that one or more of the isolation mount assemblies 180 move at same displacement as a function of time. This prevents the stand 10 or speaker system from rocking and forces a pure vertical relative motion between floor 181 and the stand 10.

Thus, in these other preferred embodiments the isolation mount assemblies 180 allow for targeted low frequency isolation (about a few hundred hertz or less) and are capable of acting independently of one another, or the isolation mount assemblies 180 can be forced to have same relative motion.

In addition, the low frequency isolation mount assemblies 180 may be embodiment to have, or be replaced with, any suitable design, for example and an air spring, a coil spring, or an elastomeric, and can embodied as a either a spring or a spring and damper combination, and other types of spring-acting components now known or developed in the future. All of these other preferred embodiments provide for low frequency isolation of about a few hundred hertz or less.

Figure 22:
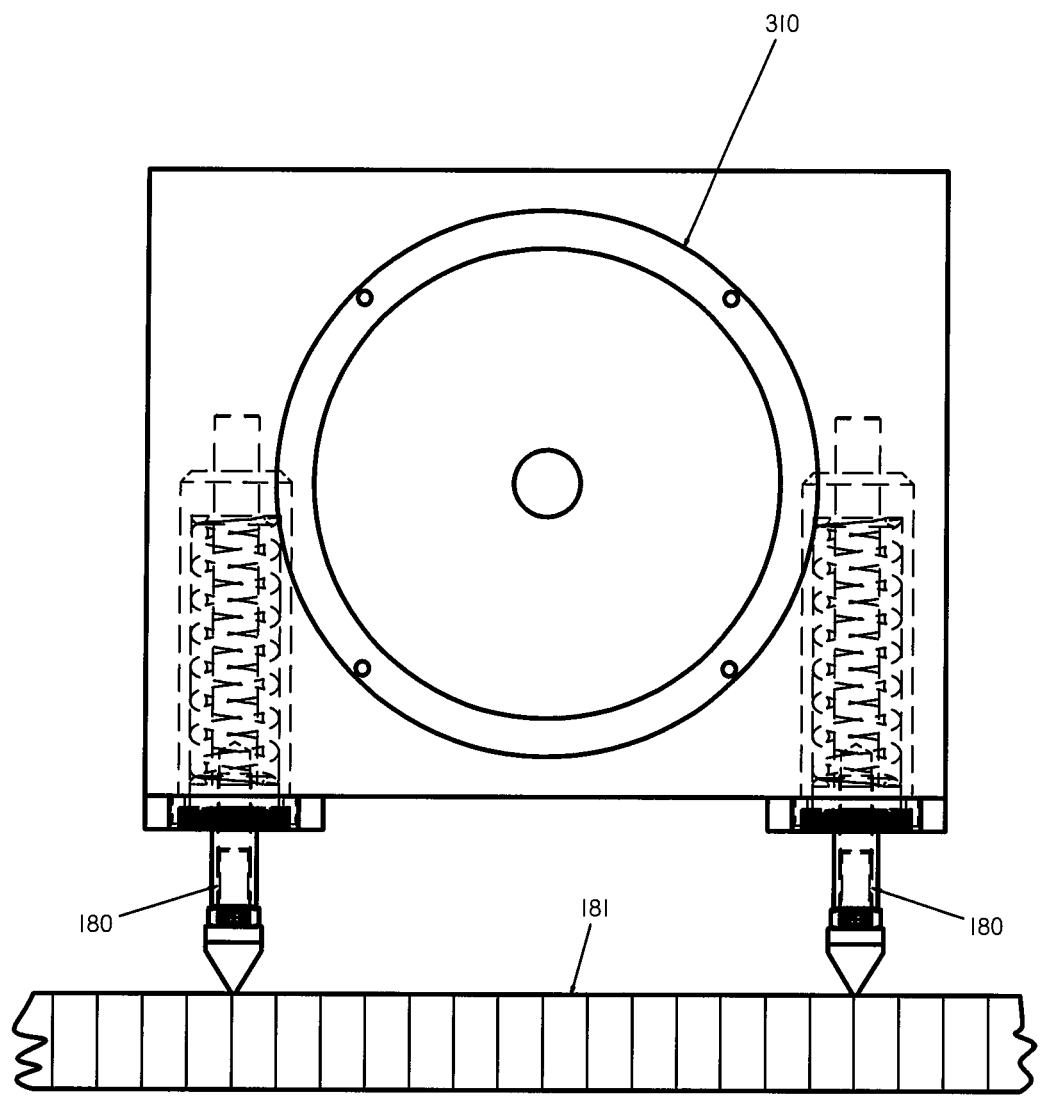
FIG. 22 is a front view of a speaker supported on the ground.

As shown in FIG. 22, in other preferred embodiments, the stand 10 is not present and there is a speaker 310 supported on the floor 181 or ground or any suitable surface. The above-described isolation mount assemblies 180 are used directly with and support the speaker 310 as shown. Not only can the speaker 310 be supported on the isolation mount assemblies 180, but also virtually any piece or type of electronic equipment can be supported on the isolation mount assemblies 180. The isolation mount assemblies 180 prevent the transfer of low frequency energy generated by the speaker 310 (or other devices and equipment) to the floor 181. The isolation mount assemblies 180 thus prevent low frequency energy transfer from the speaker 310 to the floor 181 and this prevents the degradation of outputs from the speaker 310 or other electronic equipment supported by the isolation mount assemblies 180.

In another preferred embodiment, the isolation mount assemblies 180 are installed in the speaker 310 at the point of manufacture and sold with the speaker 310 (or other piece of electronic equipment).

In another preferred embodiment shown in FIGS. 23-25A there is a modular performance stand 500. The width and depth of the modular performance stand 500 can be readily adjusted for at the point of manufacture or by the end user due to the modularity of the components from which the modular performance stand 500 is made. In addition, as will be describe presently, the modular shelf mounts 504a, 504b and number of isolators 85 utilized in the modular performance stand 500 can be readily varied at the point of manufacture or by the end user to optimize the load bearing capacity and performance of the modular performance stand 500.

Figure 23:
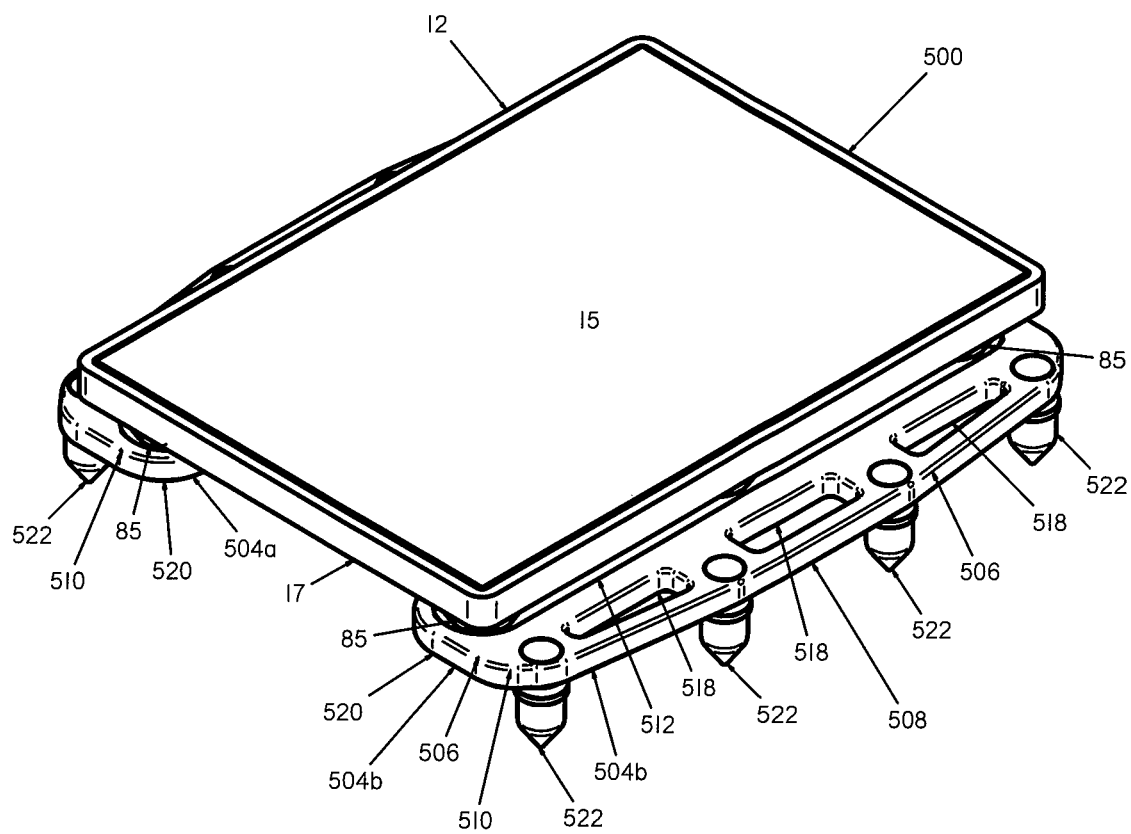
FIG. 23 is a perspective view of a modular performance stand having one shelf.
Figure 24:
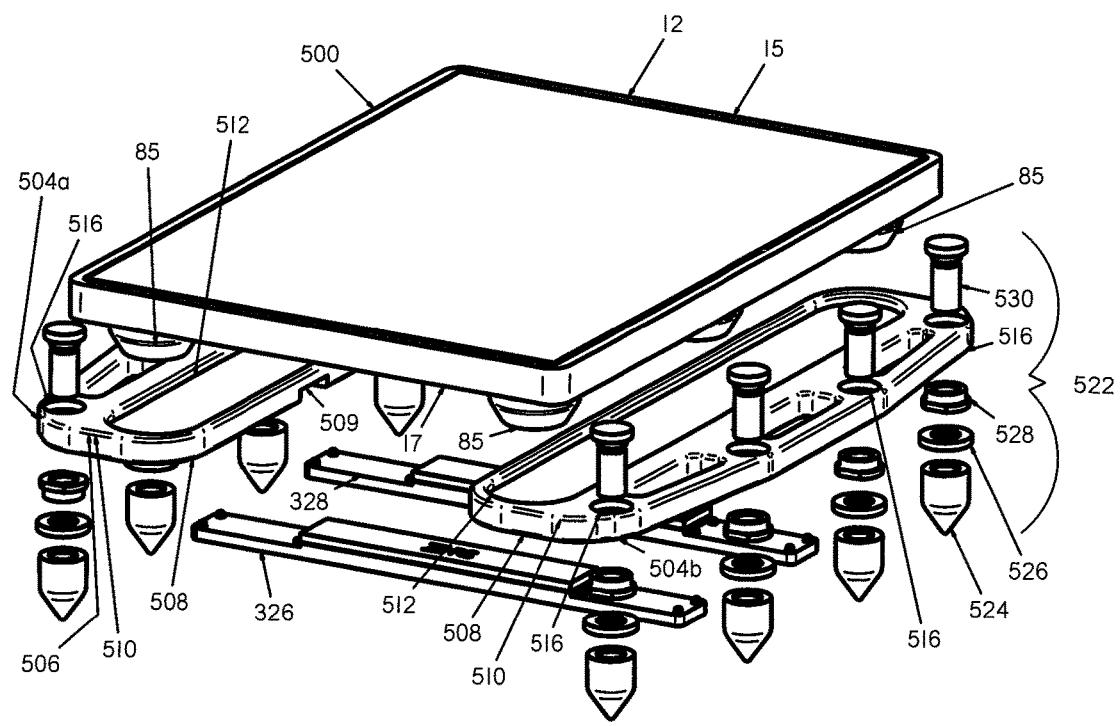
FIG. 24 is and exploded view of the modular performance stand having one shelf.

FIG. 23 is a perspective view and FIG. 24 is an exploded view showing the modular performance stand 500 that is supporting one shelf 12. As shown, the shelf 12 has opposed first and second shelf sides 15, 17. Joined or connected to the second shelf side 17 are isolator elements 85. The shelf 12 has six isolator elements 85 that are arranged proximal the edge of the shelf 12. The isolator elements 85 are connected to the shelf 17 with screws, bolts or other means. It is to be understood that there may be more or less than six isolator elements 85 in other preferred embodiments. That is, the number of isolator elements 85 can be varied depending on the load on the shelf 12 and can be varied to optimize performance of the modular performance stand 500. It is pointed out that isolator elements 85 can be added to existing modular performance stands 500 for additional support capacity and to enhance performance of the modular performance stand 500. The end user can add the additional isolator elements 85, or the factory that produces the modular performance stands 500 can add them.

Figure 25:
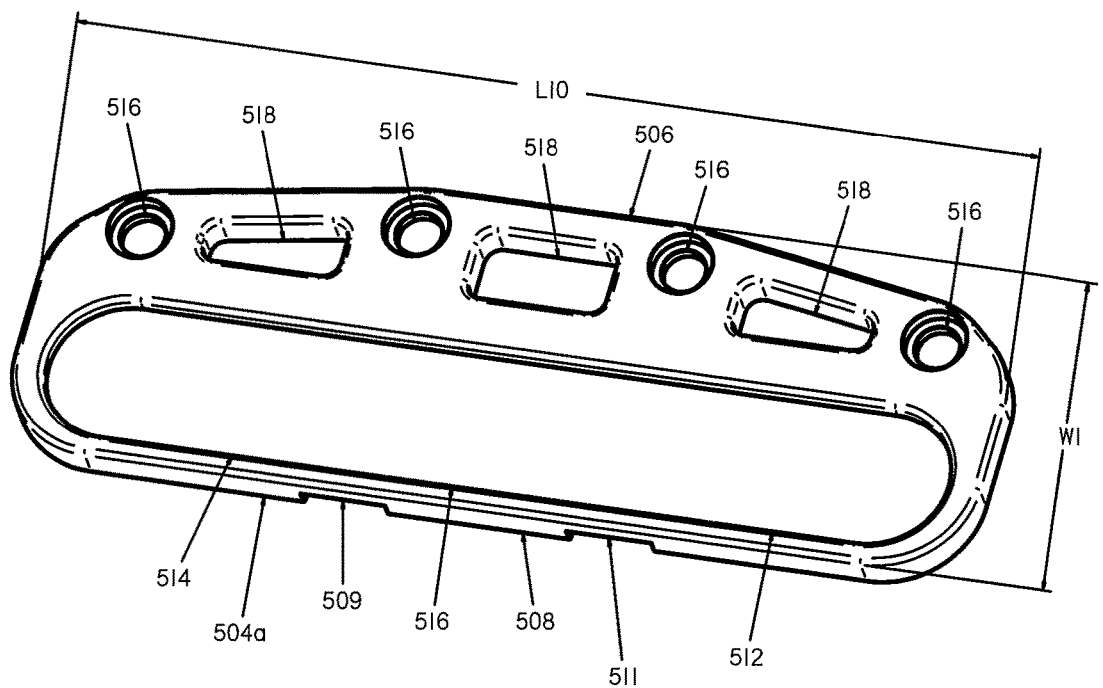
FIG. 25 is a perspective view of a modular shelf mount.

As shown in FIGS. 24 and 25, the modular performance stand 500 also has identical first and second modular shelf mounts 504a, 504b that serve as braces for the modular performance stand 500. Best shown in FIG. 25 the first modular shelf mounts 504a has a length designated L10 and width designated W1. The length L10 of the first and second modular shelf mounts 504a, 504b can be varied without limit, such that differently sized and shaped modular performance stand 500 can be made. Each of the first and second modular shelf mounts 504a, 504b have opposed first and second modular shelf mount sides 506, 508, with the first modular shelf mounts side 506 having a flat surface portion 510. Each of the first and second modular shelf mounts 504a, 504b defines a channel 512. In particular, the channel 512 is defined by a channel base wall 514 that extends to a surrounding channel wall 516. The channel surrounding wall 516 meets with the flat surface portion 510 of the first modular shelf mounts side 506. The channel 512 is sized to receive the isolator elements 85, such that the isolator elements 85 are capable of being positioned at virtually any location in the channel 512 and supported on the channel base wall 514. Also defined in the first and second modular shelf mounts 504a, 504b are leg openings 516 and through openings 518.

As shown there is only one channel 512, but it is to be understood that in other preferred embodiments there may be two or more channels 512 defined in the first and second modular shelf mounts 504a, 504b, with each channel 512 sized to receive at least one isolator element 85.

Figure 25A:
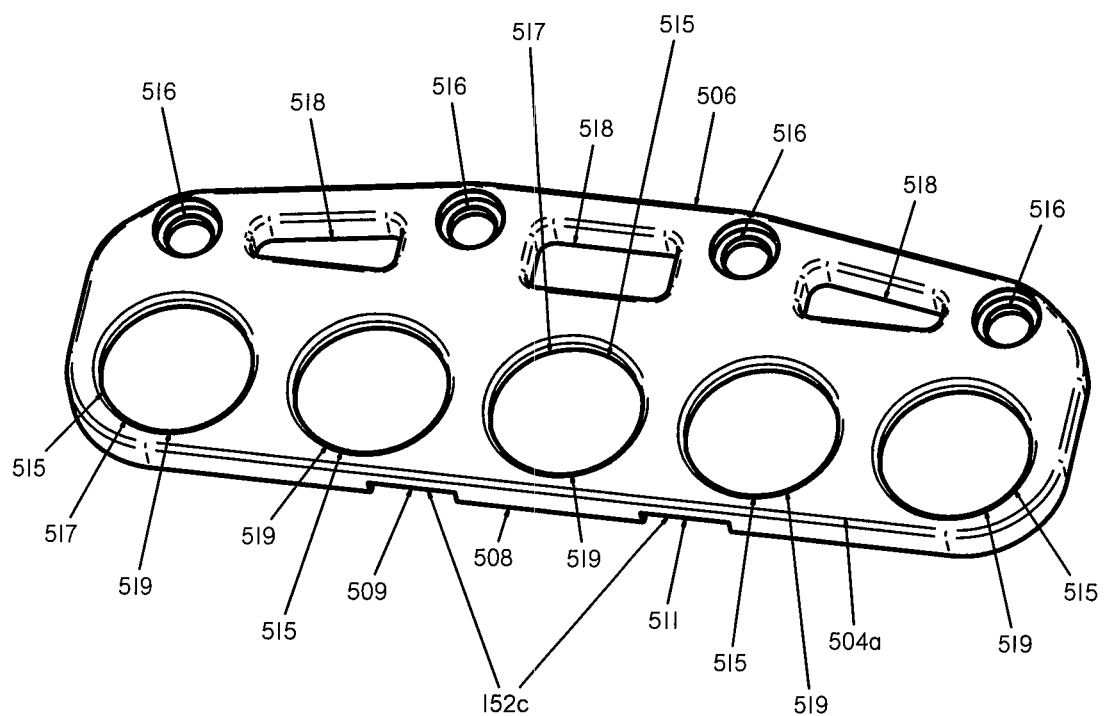
FIG. 25A is a perspective view of another embodiment of the modular shelf mount.

In another preferred embodiment shown in FIG. 25A, the channel 512 can be otherwise embodied. In particular, in this embodiment isolator receiving recesses commonly designated 515 are defined in the first and second shelf mounts 504a, 504b. The isolator receiving recesses 515 replace the channels 512 and are sized to receive the isolator elements 85 therein. Each of the isolator receiving recesses 515 is defined by an isolator recess base wall 517 that extends an isolator recess surrounding wall 519. The isolator recess surrounding wall 519, in turn, extends to the first modular shelf mounts side 506. The of number of isolator receiving recesses 515 shown is five, but it is to be understood that in other embodiments there may be less or more than five isolator receiving recesses defined in the first and second shelf mounts 504a, 504b, and they may be spaced equal distance from one another or may be spaced at different distances from one another.

Defined in the second modular shelf mount sides 508 of the first and second modular shelf mounts 504a, 504b is a pair of cross damping support arm recesses 509, 511 sized to receive the previously described cross double damper support arms 326, 328 as shown. Each of the cross double damper support arms 326, 328 is connected to the both of the first and second modular shelf mounts 504a, 504b with screws or other suitable fasteners in the manner described above, thus holding the first and second modular shelf mounts 504a, 504b and the cross double damper support arms together. In particular, there are When assembled each of the cross double damper support arms 326, 328 is connected to the both of the first and second modular shelf mounts 504a, 504b form a support platform 520.

As further shown in FIGS. 23 and 24, the support platform 520 is supported on support platform isolation mount assemblies 522 having a cone element 524, a washer or bearing 526, a lock nut 528 and a strut member 530. Only one support platform isolation mount assembly 522 is numbered for the sake of clarity. The strut members 530 extend through the leg openings 516 and are threaded to the lock nuts 528 to secure the strut members 530 to the support platform 520. The strut members 530 extend through the washers 526 and into the cone elements 524 and may be hollow, solid or filled with damping material. The cone elements 524 are supported on a floor can be rotated to level the modular performance stand 500.

Thus, the modularity of the cross damping support arms commonly designated 82 cross damping support arms 82 and the first and second modular shelf mounts 504a, 504b provides for a modular performance stand 500, wherein the width and depth of the modular performance stand 500 can be readily varied at the point of manufacture or by an end used. This is accomplished by taking the prefabricated cross damping support arms 82 with different lengths L2 and modular shelf mounts 504a, 504b with different lengths having differing lengths L1 and constructing differently sized modular performance stands 500.

Figure 26:
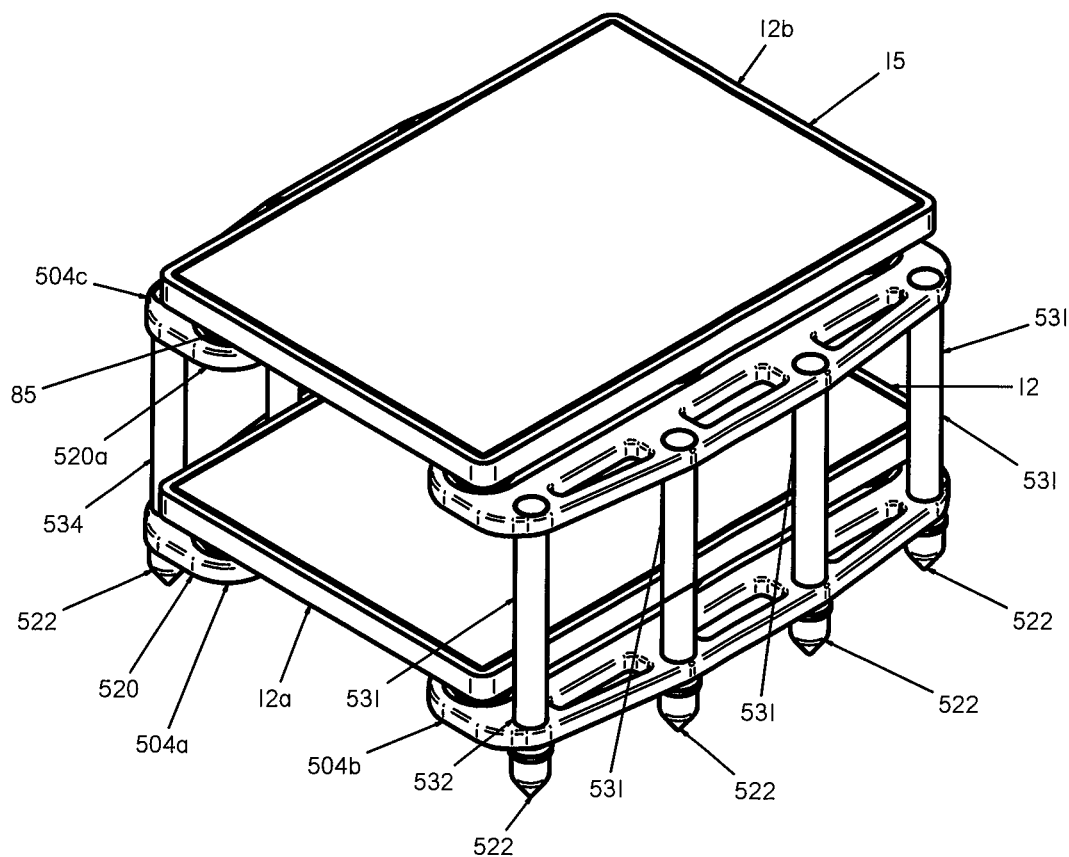
FIG. 26 is a perspective view of a modular performance stand having two shelves.
Figure 27:
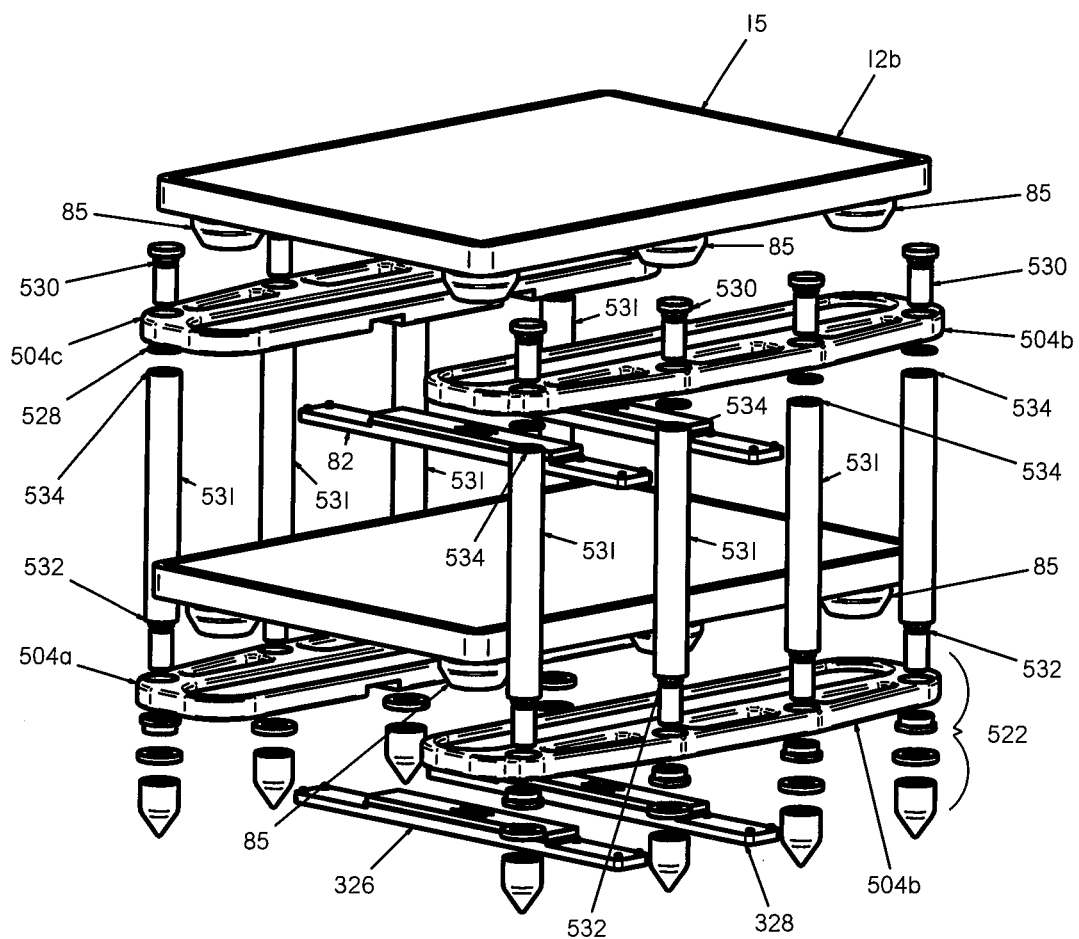
FIG. 27 is an exploded view of a modular performance stand having first and second shelves.

In another preferred embodiment shown in FIGS. 26 and 27 there is a modular performance stand 500 having first and second shelves 12a, 12b. As shown, the first shelf 12a is supported in the same manner as the shelf 12 described above. There is a second support platform 520a that includes third and fourth modular shelf mounts 504c, 504d connected to structurally identical cross double damper support arms 326, 328. Support legs 531 that are hollow are provided. In other preferred embodiments the support legs 531 may be solid or filled with damping material. The support legs 531 have first support leg ends 532 that connect with the support platform isolation mount assemblies 522. The support legs 531 have second support leg ends 534 and are connected to the third and fourth modular shelf mounts 504c, 504d with a strut 530 and lock nut 528 such that the struts 528 disposed in the support legs 531. In other preferred embodiments there may be a third, a fourth or more shelves to allow the modular performance stand 500 to be built taller.

Thus, the modularity of the cross damping support arms and modular shelf mounts allows the width and depth of the modular performance stand 500 to be readily varied by changing these components. The height of the modular performance stand 500 can also be adjusted. This makes modifications to existing modular performance stand 500 straightforward. This also allows for a vast array of differently dimensioned modular performance stands 500 to be constructed and all of which are within the scope of this invention. In addition, this allows for the facilitated construction of customized stands because width and depth requirements can be satisfied by using pre-made cross damping support arms and modular shelf mounts. Also, it is to be understood that the shapes of the first and second modular shelf mounts 504a, 504b and the shapes of the other components of the of the modular performance stand 500 can be variously embodied and all such embodiments are within the scope of this invention.

In other preferred embodiments the above-described stands could be made with just one of the leg 20, hollow leg 20a, rectangular shaped leg 20b, or segmented leg 20c. And, in other preferred embodiments there may be fewer than four legs 20, four hollow legs 20a, four rectangular shaped legs 20b, or four segmented legs 20c. For example, the brace assembly 80 and double damper brace assembly 320c may be supported by just two or three of the above-described legs. Thus, the number of the above-described legs can be varied.

It will be appreciated by those skilled in the art that while a modular and reconfigurable stand 10, stands 10a, and stand 10b and a modular performance stand 500 have been described in connection with particular embodiments and examples, the modular and reconfigurable stands 10, 10a, 10b and the modular performance stand 500 are not necessarily so limited and that other examples, uses, modifications, and departures from the embodiments, examples, and uses may be made without departing from the modular and reconfigurable stands 10, 10a, 10b and the modular performance stand 500. All these embodiments are intended to be within the scope and spirit of the appended claims.

What is claimed:

1. A modular and reconfigurable stand comprising:
   a segmented leg having leg segments and wherein the lengths of the leg segments are capable of being varied;
   bolt plates and each bolt plate defines bolt plate openings and a bolt plate is connected to each of the leg segments with fasteners;
   a brace assembly having first and second brace mounts and the brace assembly is for supporting a shelf;
   another segmented leg having leg segments and wherein the lengths of the leg segments are capable of being varied and the bolt plates are connected with fasteners to each of the leg segments of the another segmented leg;
   fasteners extend through the first brace mount and through the bolt plate and into the leg segment of the segmented leg, and fasteners extend through the second brace mount and the bolt plate connected to the leg segment of the another segmented leg such the brace assembly is supported by the segmented leg and the another segmented leg; and,
   wherein the brace assembly is vertically adjustable by removing the fasteners and vertically moving the brace assembly along the same bolt plate connected to the leg segment of the segmented leg and vertically moving the brace assembly along the same bolt plate connected to the leg segment of the another segmented leg and extending the fasteners through the bolt plate openings so that the brace assembly is connected to the same leg segment of the segmented leg and connected to the same leg segment of the another segmented leg at a different vertical location, and wherein the brace assembly includes one or more cross damping support arms and identical first and second brace mounts, and each of the cross damping support arms is connected to each of the first and second brace mounts, and each of the cross damping support arms includes first and second plates that define a damper recess such that when the first and second plates are brought together the damper recesses together define a damper cavity and a support arm damper is positioned in the damper cavity.

2. A modular reconfigurable stand comprising:
   four segmented legs having each having leg segments and a bolt plate connected to each of the leg segments and the bolt plate defines a plurality of bolt plate openings
   fasteners sized to be fitted through the bolt plate openings;
   the four segmented legs are arranged in first and second segmented leg pairs wherein the first segmented leg pair faces the second segmented leg pair such that the bolt plates supported by the first segmented leg pair faces the bolt plates supported by the second segmented leg pair;
   a brace assembly having opposed first and second brace assembly ends and wherein the first brace assembly end is connected with the fasteners to the bolt plates supported by two of the leg segments from the first pair of segmented legs and second brace assembly end is connected with the fasteners to the bolt plates supported by two of the two diametrically opposed leg segments from the second segmented leg pair such that the brace assembly is perpendicular to the four segmented legs and wherein the brace assembly is for supporting a shelf;
   wherein the brace assembly is vertically adjustable by removing the fasteners and vertically moving the brace assembly along the same bolt plates connected to the same leg segments of the four segmented legs and extending the fasteners through the bolt plate openings so that the brace assembly is connected to the same leg segments of the four segmented legs at a different vertical location;
   wherein the brace assembly includes first and second brace mounts and includes a cross damping support arm and the cross damping support arm is connected to each of the first and second brace mounts and wherein the leg segments have lengths that are capable of being varied; and,
   wherein the brace assembly includes one or more structurally identical cross damping support arms and identical first and second brace mounts, and each of the cross damping support arms is connected to each of the first and second brace mounts, and each of the cross damping support arms includes first and second plates that are structurally identical and define damper recesses such that when the first and second plates are brought together the damper recesses together define a damper cavity and a support arm damper is positioned in the damper cavity.

3. A modular reconfigurable stand comprising:
   four segmented legs having each having leg segments and a bolt plate connected to each of the leg segments and the bolt plate defines a plurality of bolt plate openings;
   fasteners sized to be fitted through the bolt plate openings;
   the four segmented legs are arranged in first and second segmented leg pairs wherein he first segmented leg pair faces the second segmented leg pair such that the bolt plates supported by the first segmented leg pair faces the bolt plates supported by the second segmented leg pair;
   a double damper brace assembly having opposed first and second double damper brace ends and wherein the first double damper brace end connected with the fasteners to the bolt plates supported by two of the leg segments from the first pair of segmented legs and second double damper brace end is connected with the fasteners to the bolt plates supported by two of the two diametrically opposed leg segments from the second segmented leg pair such that the brace assembly is perpendicular to the four segmented legs and wherein the double damper brace assembly is for supporting a shelf;
   wherein the double damper brace assembly includes first and second has opposed double damper brace mounts and includes a cross double damper support arm and the cross double damper support arm is connected to each of the first and second double damper brace mounts wherein the leg segments have lengths that are capable of being varied;
   wherein the double damper brace assembly is vertically adjustable by removing the fasteners and vertically moving the double damper brace assembly along the same bolt plates connected to the same leg segments of the four segmented legs and extending the fasteners through the bolt plate openings so that the double damper brace assembly is connected to the same leg segments of the four segmented legs at a different vertical location, and wherein the double damper brace assembly also has opposed first and second double damper brace ends and opposed first and second double damper brace mounts, and has structurally identical cross double damper support arms, and each of the cross double damper support arms has a first and second double damper support arm end and has first and second damper recesses, and opposed first and second double damper support arm sides, and wherein the first and second damper recesses extend inwardly from the first damper side such that each of the cross double damper support arms also includes first and second dampers and a damper cover plate, and wherein the first damper is fitted in the first damper recess and the second damper is fitted in the second damper recess, and a damper cover plate retains the first and second dampers in place.

* * * * *